(12) United States Patent
Kim et al.

(10) Patent No.: US 12,621,196 B2
(45) Date of Patent: May 5, 2026

(54) METHOD AND DEVICE FOR TRANSMITTING/RECEIVING DEMODULATION REFERENCE SIGNAL IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Haewook Park, Seoul (KR); Kyuseok Kim, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 18/578,678

(22) PCT Filed: Jul. 12, 2022

(86) PCT No.: PCT/KR2022/010085
§ 371 (c)(1),
(2) Date: Jan. 11, 2024

(87) PCT Pub. No.: WO2023/287147
PCT Pub. Date: Jan. 19, 2023

(65) Prior Publication Data
US 2024/0333571 A1     Oct. 3, 2024

(30) Foreign Application Priority Data
Jul. 16, 2021     (KR) ........................ 10-2021-0093273

(51) Int. Cl.
*H04L 27/26*          (2006.01)
*H04L 5/00*           (2006.01)
*H04W 72/232*         (2023.01)

(52) U.S. Cl.
CPC .......... *H04L 27/261* (2013.01); *H04L 5/0007* (2013.01); *H04L 5/0048* (2013.01); *H04W 72/232* (2023.01)

(58) Field of Classification Search
CPC ... H04L 27/261; H04L 5/0007; H04L 5/0048; H04W 72/232
(Continued)

(56) References Cited

U.S. PATENT DOCUMENTS

| | | | |
|---|---|---|---|
| 10,171,225 B2 * | 1/2019 | Horiuchi | ............... H04L 1/0001 |
| 11,558,159 B2 * | 1/2023 | Manolakos | ........... H04W 72/23 |

(Continued)

FOREIGN PATENT DOCUMENTS

| | | | | |
|---|---|---|---|---|
| CA | 3082587 A1 * | 5/2019 | ........ | H04W 72/0453 |
| CA | 3049702 C * | 8/2022 | ........... | H04L 5/0007 |

(Continued)

OTHER PUBLICATIONS

PCT International Application No. PCT/KR2022/010085, International Search Report dated Oct. 21, 2022, 4 pages.

*Primary Examiner* — Asad M Nawaz
(74) *Attorney, Agent, or Firm* — LEE, HONG, DEGERMAN, KANG & WAIMEY

(57)          ABSTRACT

A method and a device for transmitting/receiving a demodulation reference signal in a wireless communication system are disclosed. A method for receiving a demodulation reference signal (DM-RS) according to an embodiment of the present disclosure may include the steps of: receiving configuration information related to a DM-RS from a base station; receiving a downlink control information (DCI) for scheduling a physical downlink control channel (PDSCH) from the base station; and receiving the PDSCH and a MD-RS for the PDSCH, based on the DCI.

12 Claims, 10 Drawing Sheets

(58) Field of Classification Search
    USPC ......................................................... 370/329
    See application file for complete search history.

(56)                          References Cited

U.S. PATENT DOCUMENTS

| | | | | |
|---|---|---|---|---|
| 2015/0223216 A1 * | 8/2015 | Han | ................... | H04W 72/044 |
| | | | | 370/329 |
| 2020/0137792 A1 * | 4/2020 | Yoon | .................... | H04L 5/0041 |

FOREIGN PATENT DOCUMENTS

| | | | | | |
|---|---|---|---|---|---|
| EP | 3432485 | A1 * | 1/2019 | ............ | H04W 72/23 |
| EP | 4373023 | A1 * | 5/2024 | ........... | H04L 5/0053 |
| JP | 2020010072 | | 1/2020 | | |
| JP | 2021502777 | | 1/2021 | | |
| KR | 1020180004849 | | 1/2018 | | |
| KR | 1020190059976 | | 5/2019 | | |
| WO | WO-2018084239 | A1 * | 5/2018 | ........... | H04L 5/0091 |
| WO | 2021018209 | | 2/2021 | | |
| WO | WO-2021178788 | A1 * | 9/2021 | ............ | H04W 72/23 |
| WO | WO-2023287147 | A1 * | 1/2023 | ........... | H04L 5/0053 |
| WO | WO-2025162123 | A1 * | 8/2025 | ............ | H04W 16/14 |

* cited by examiner

Radio Frame 10ms

Subframe 1ms 0 1 2 3 4 5 6 7 8 9

Fixed Size

Subframe ={1,2,4} Slots

Slot 0 1 2 3

Slot={7,14} Symbols

Symbol 0 1 2 3 4 5 6 7 8 9 10 11 12 13

Size depends on subcarrier spacing

Mini-Slot
(URLLC)

Mini-Slot={2,4,7} Symbols

FIG.6

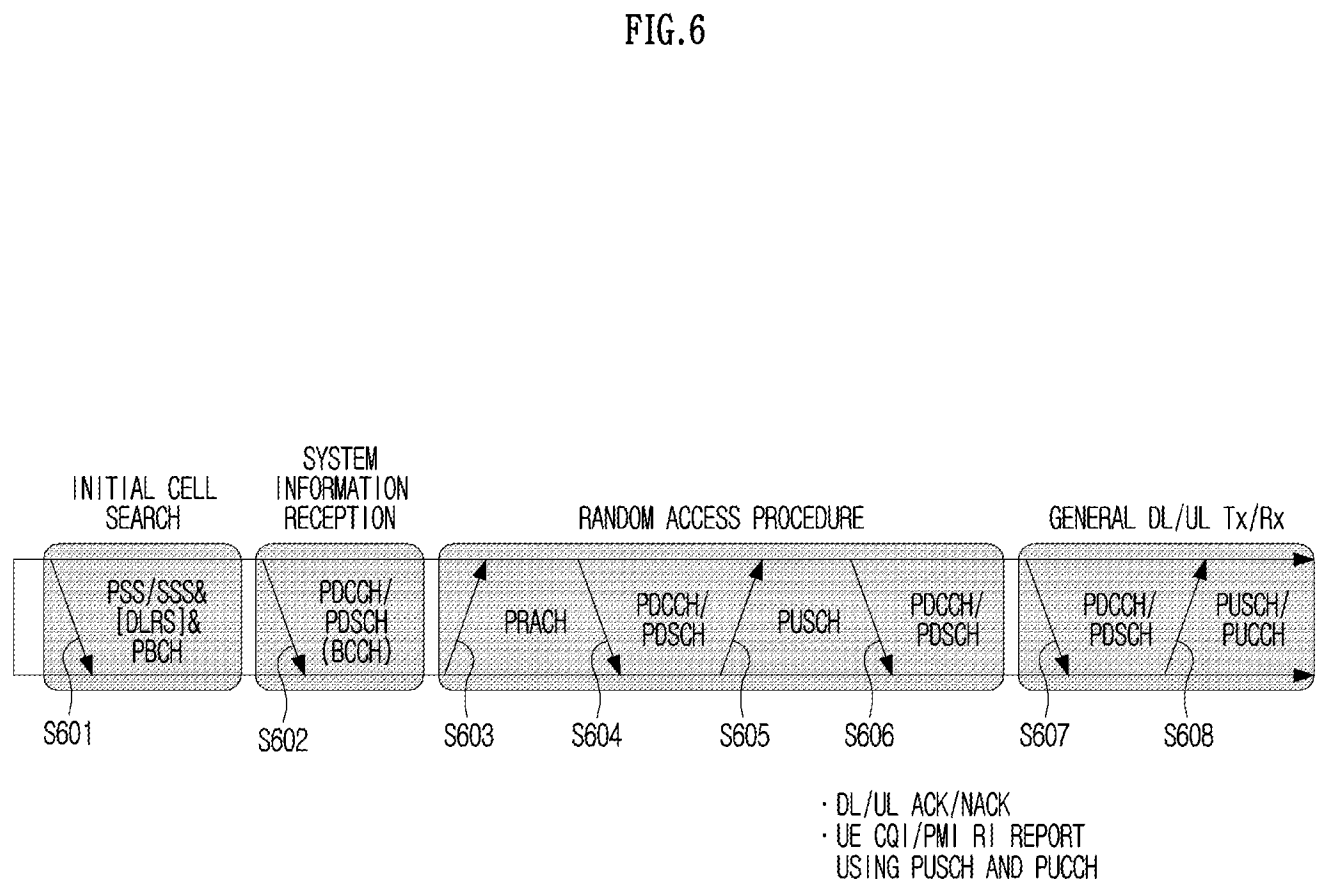

INITIAL CELL SEARCH

PSS/SSS& [DL RS]& PBCH

S601

SYSTEM INFORMATION RECEPTION

PDCCH/ PDSCH (BCCH)

S602

RANDOM ACCESS PROCEDURE

PRACH

S603

PDCCH/ PDSCH

S604

PUSCH

S605

PDCCH/ PDSCH

S606

GENERAL DL/UL Tx/Rx

PDCCH/ PDSCH

S607

PUSCH/ PUCCH

S608

· DL/UL ACK/NACK
· UE CQI/PMI RI REPORT USING PUSCH AND PUCCH

DMRS configuration type 1        DMRS configuration type 2

METHOD AND DEVICE FOR TRANSMITTING/RECEIVING DEMODULATION REFERENCE SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2022/010085, filed on Jul. 12, 2022, which claims the benefit of earlier filing date and right of priority to Korean Application No. 10-2021-0093273, filed on Jul. 16, 2021, the contents of which are all incorporated by reference herein in their entirety.

TECHNICAL FIELD

The present disclosure relates to a wireless communication system, and in more detail, relates to a method and an apparatus of transmitting and receiving a demodulation reference signal (DM-RS) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for transmitting and receiving a DM-RS.

In addition, an additional technical object of the present disclosure is to provide a method and an apparatus for configuring a pattern in which a DM-RS is mapped in frequency-time resources.

The technical objects to be achieved by the present disclosure are not limited to the above-described technical objects, and other technical objects which are not described herein will be clearly understood by those skilled in the pertinent art from the following description.

A method of receiving a demodulation reference signal (DM-RS) in a wireless communication system may include: receiving, from a base station, configuration information related to a DM-RS; receiving, from the base station, downlink control information (DCI) for scheduling a physical downlink control channel (PDSCH); and receiving the PDSCH and a DM-RS for the PDSCH based on the DCI. i)

A first DM-RS pattern and ii) a second DM-RS pattern having less density than the first DM-RS pattern in a frequency domain may be configured by the configuration information, and based on whether one or more antenna ports indicated by the DCI are associated with single-user (SU) transmission or multi-user (MU) transmission, a pattern of the DM-RS may be determined among the first DM-RS pattern and the second DM-RS pattern.

A method of transmitting a demodulation reference signal (DM-RS) in a wireless communication system according to an additional aspect of the present disclosure may include: transmitting, to a user equipment (UE), configuration information related to a DM-RS; transmitting, to the UE, downlink control information (DCI) for scheduling a physical downlink control channel (PDSCH); and transmitting the PDSCH and a DM-RS for the PDSCH based on the DCI. i) A first DM-RS pattern and ii) a second DM-RS pattern having less density than the first DM-RS pattern in a frequency domain may be configured by the configuration information, and based on whether one or more antenna ports indicated by the DCI may be associated with single-user (SU) transmission or multi-user (MU) transmission, a pattern of the DM-RS is determined among the first DM-RS pattern and the second DM-RS pattern.

According to an embodiment of the present disclosure, lower overhead and more antenna ports can be supported compared to the existing DM-RS pattern.

In addition, according to an embodiment of the present disclosure, by reducing DM-RS overhead and applying an optimized DM-RS pattern, throughput for data transmission and reception can be improved.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

3

Figure 9:
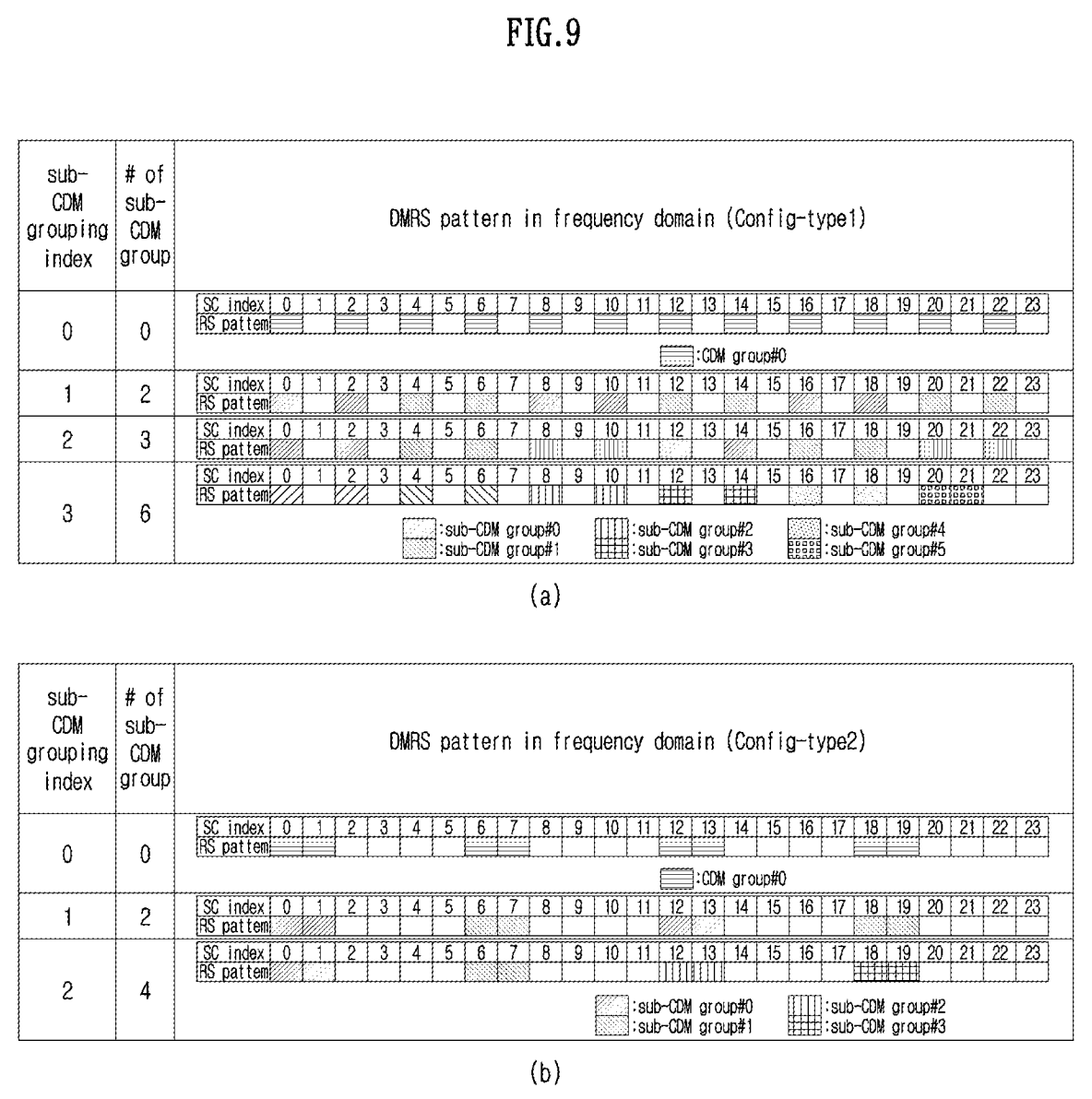

FIG. 9 illustrates a CDM group according to one embodiment of the present disclosure.

Figure 10:
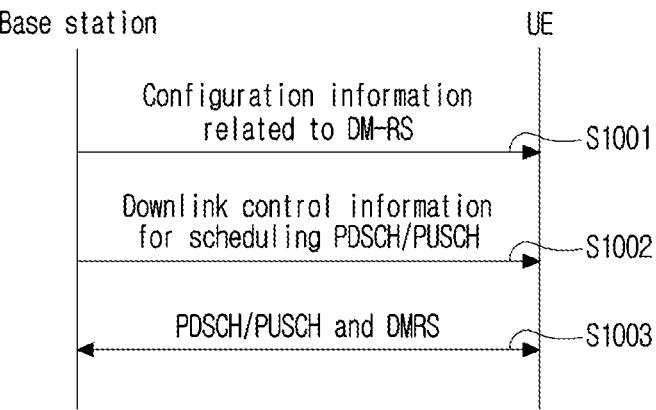

FIG. 10 illustrates a signaling procedure between a base station and a UE for a method of transmitting and receiving a DM-RS according to an embodiment of the present disclosure.

Figure 11:
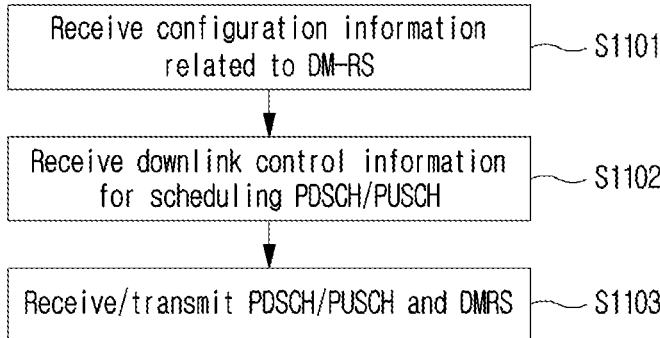

FIG. 11 illustrates an operation of a UE for a method of transmitting and receiving a DM-RS according to an embodiment of the present disclosure.

Figure 12:
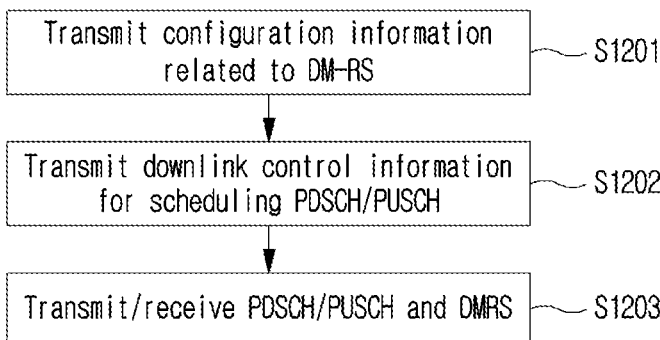

FIG. 12 illustrates an operation of a base station for a method of transmitting and receiving a DM-RS according to an embodiment of the present disclosure.

Figure 13:
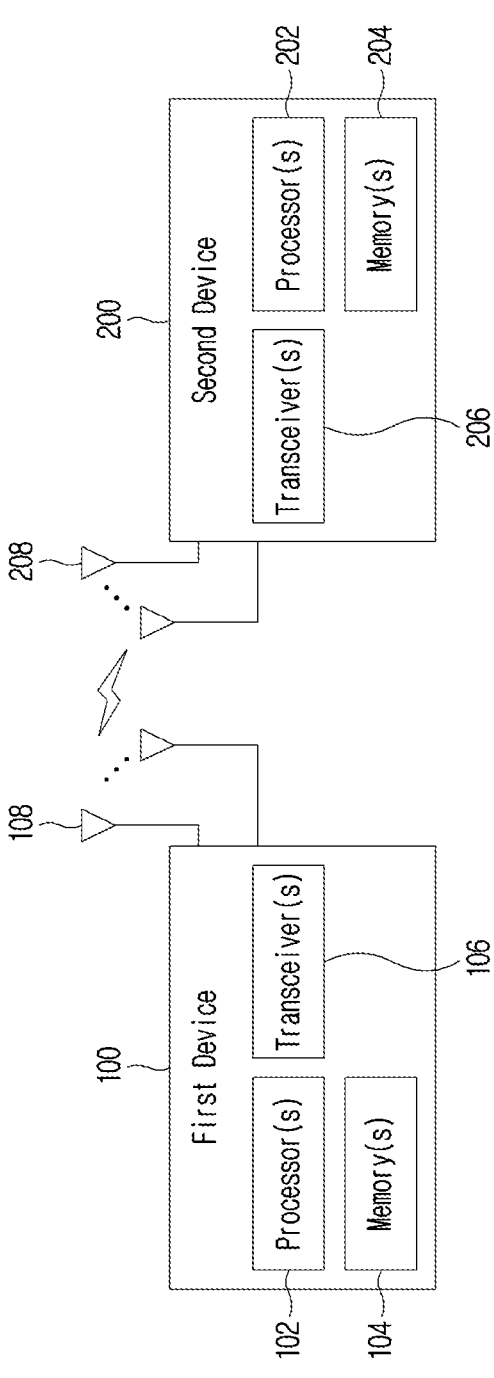

FIG. 13 illustrates a block diagram of a wireless communication device according to an embodiment of the present disclosure.

DETAILED DESCRIPTION

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

Figure 1:
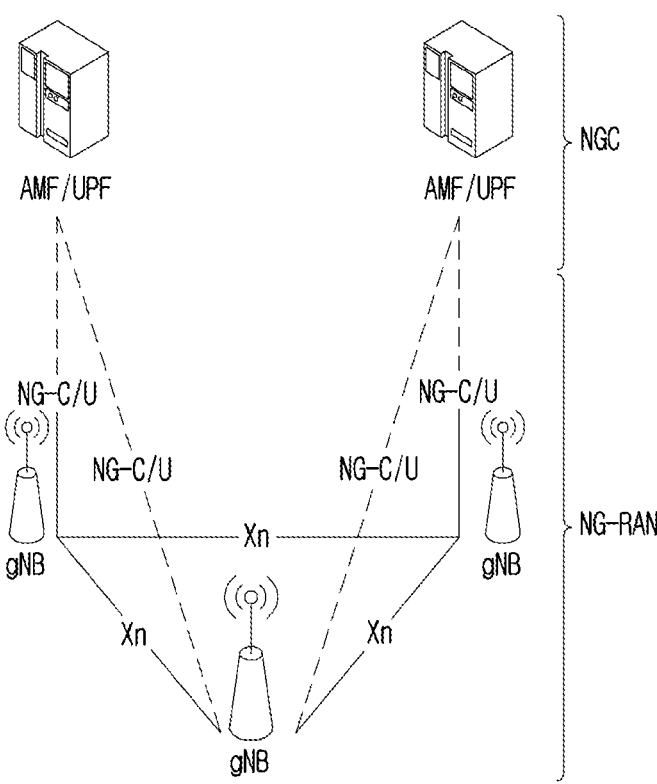
FIG. 1 illustrates a structure of a wireless communication system to which the present disclosure may be applied.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
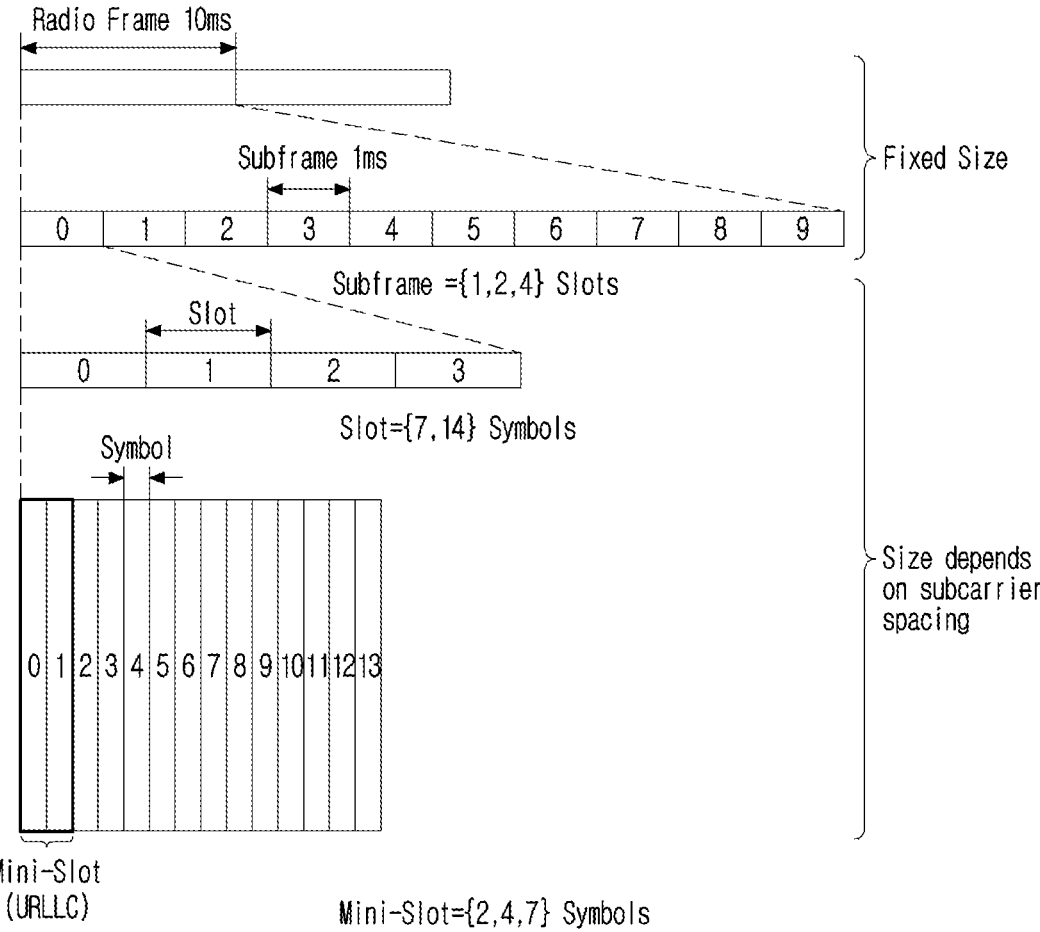
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 KHz/60 kHz, dense-urban, lower latency and a wider carrier band-width are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 103$ Hz and $N_f$ is 4096. Downlink and uplink transmission is con-figured (organized) with a radio frame having a duration of $T_f=1/(\Delta f_{max} N_f/100) \cdot T_c=10$ ms. Here, a radio frame is con-figured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a cor-responding terminal starts. For a subcarrier spacing configu-ration $\mu$, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is deter-mined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\,\mu}$ | $N_{slot}^{subframe,\,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-loca-tion) relationship. In this case, the large-scale property includes at least one of delay spread, doppler spread, fre-quency shift, average received power, received timing.

Figure 3:
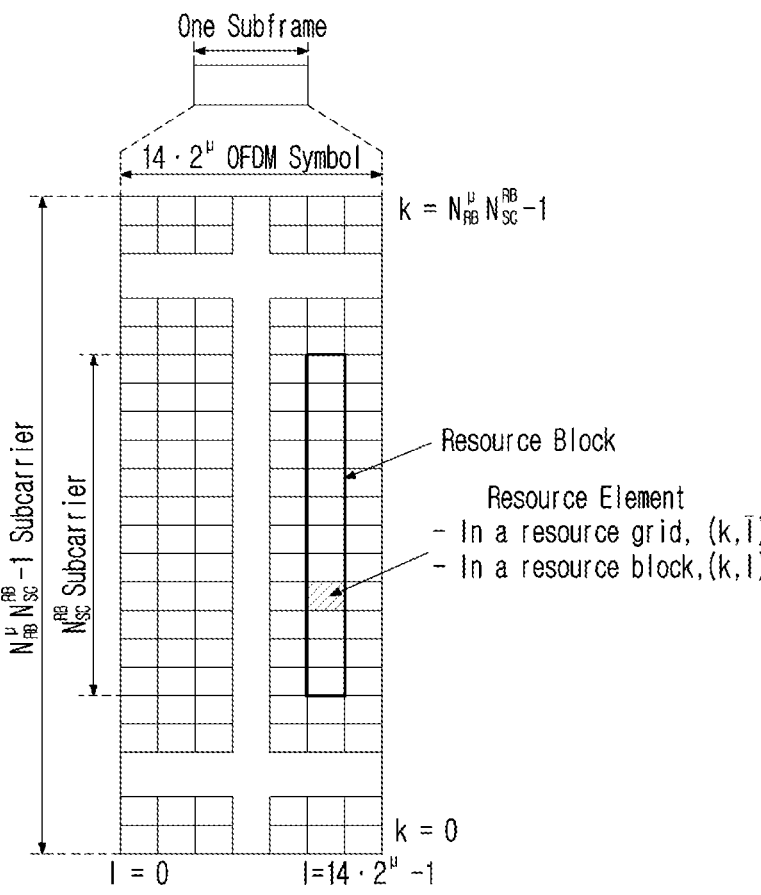
FIG. 3 illustrates a resource grid in a wireless communication system to which the present disclosure may be applied.

FIG. 3 illustrates a resource grid in a wireless communi-cation system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per $\mu$ and antenna port p. Each element of a resource grid for $\mu$ and an antenna port p is referred to as a resource element and is uniquely identified by an index pair (k,l'). Here, $k=0, \ldots, N_{RB}^{\mu} N_{sc}^{RB}-1$ is an index in a frequency domain and $l'=0, \ldots, 2^{\mu} N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for $\mu$ and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink rep-resents a frequency offset between point A and the lowest subcarrier of the lowest resource block over-lapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration $\mu$ is identical to 'point A'. A relationship between a common resource block number $n_{CRB}^{\mu}$ and a resource element (k,l) for a subcarrier spacing configuration $\mu$ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
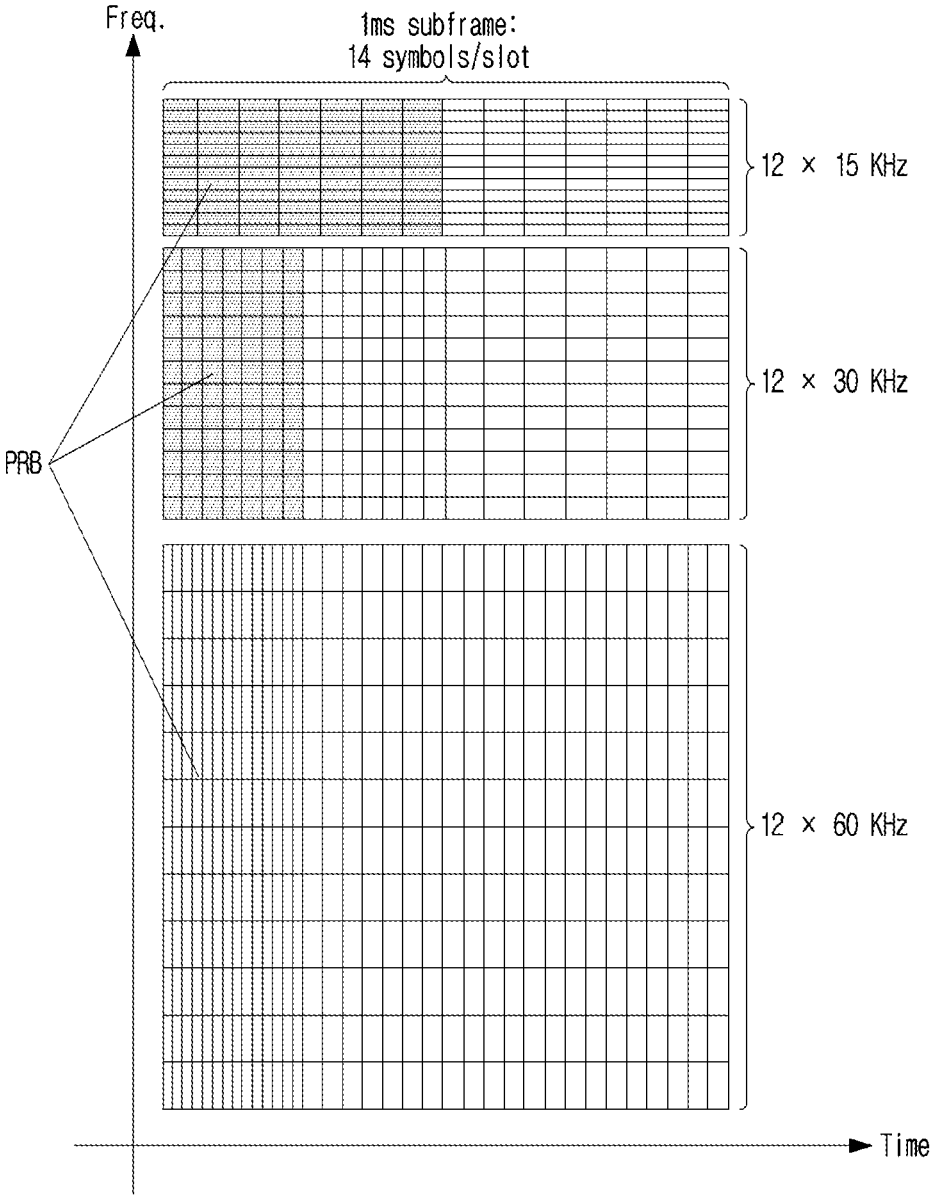
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
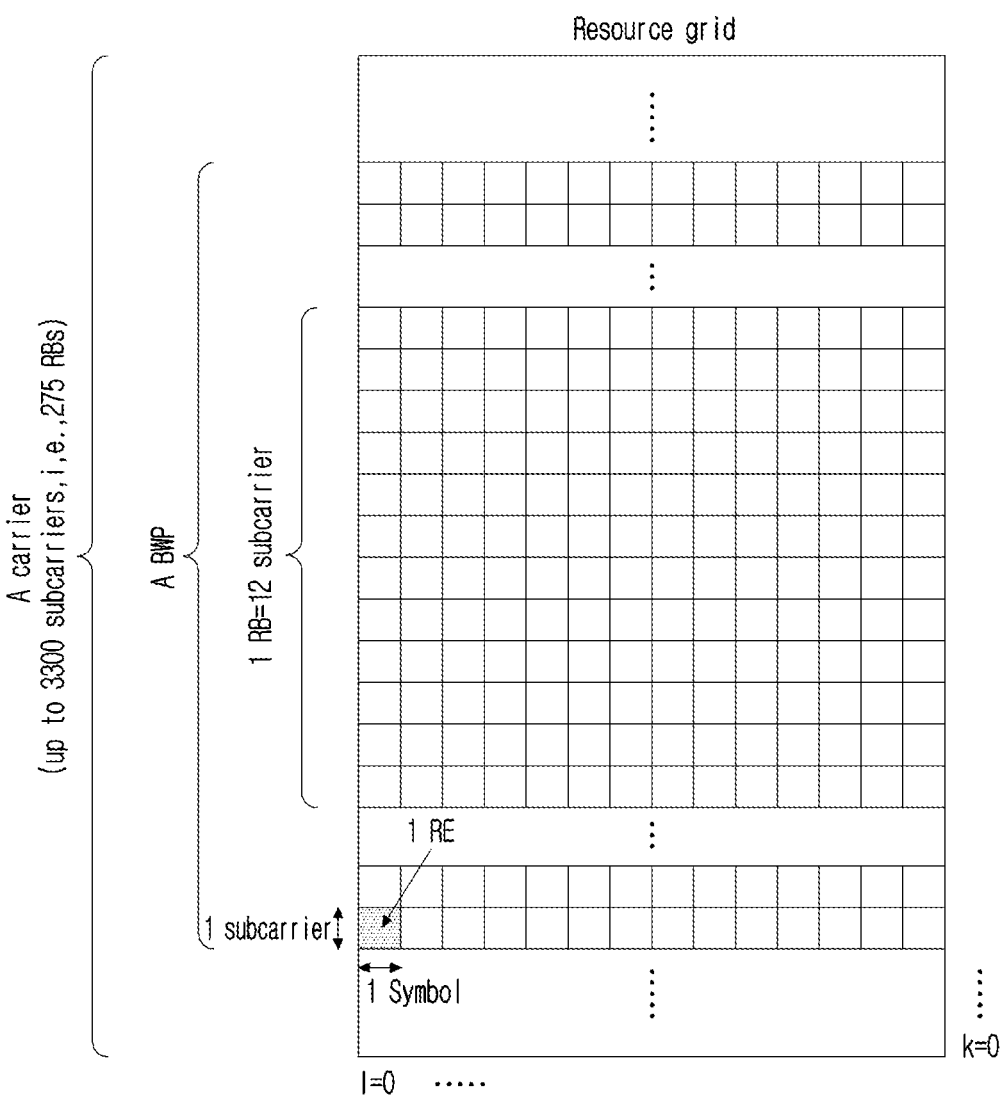
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

DM-RS Related Operations

In NR, a DM-RS is characterized by being transmitted only when necessary to enhance network energy efficiency and ensure forward compatibility. Density of DM-RS in a time domain may vary depending on speed or mobility of a UE. That is, the density for a DM-RS can be increased in a time domain to track rapid changes in wireless channels in NR.

1) DM-RS for PDSCH

DM-RS related operations for a PDSCH are described. As described above, DL refers to signal transmission (or communication) from a base station to a UE.

When receiving a PDSCH scheduled by DCI format 1_0 or when receiving a PDSCH before configuring any dedicated higher layer among the dmrs-AdditionalPosition, maxLength, and dmrs-Type parameters, a UE assumes that i) there is no PDSCH in any symbol carrying a DM-RS except for a PDSCH with an allocated duration of 2 symbols with PDSCH mapping type B, ii) a single symbol front-loaded DM-RS of configuration type 1 is transmitted on DM-RS port 1000, and iii) all remaining orthogonal antenna ports are not related to the transmission of PDSCH to other UEs. Additionally, For a PDSCH with mapping type A, a UE assumes that there are dmrs-AdditionalPosition='pos2' and up to 2 additional single-symbol DM-RSs in a slot according to a PDSCH duration period indicated in DCI.

For a PDSCH with an allocation duration of 7 symbols for a normal CP or 6 symbols for an extended CP with mapping type B, when a front-loaded DM-RS symbol is in each of the 1st or 2nd symbols of a PDSCH allocation duration period, a UE assumes that one additional single symbol DM-RS exists in the 5th or 6th symbol. Otherwise, a UE assumes that there is no additional DM-RS symbol. and, For a PDSCH with an allocation duration of 4 symbols with mapping type B, a UE assumes that there is no additional DM-RS, For a PDSCH with an allocation duration of 2 symbols with mapping type B, a UE assumes that no additional DM-RS exists, and a UE assumes that a PDSCH exists in a symbol carrying a DM-RS.

When receiving a PDSCH scheduled by DCI format 1_1 by a PDCCH with a CRC scrambled by a C-RNTI, MCS-C-RNTI, or configured scheduling (CS)-RNTI, A UE can be configured with the higher layer parameter dmrs-Type, and a configured DM-RS configuration type is used to receive a PDSCH.

A UE can be configured with the maximum number of front-loaded DM-RS symbols for a PDSCH by the higher layer parameter maxLength given by DMRS-DownlinkConfig.

The number of DM-RS ports may be scheduled for a UE according to an antenna port index of DCI format 1_1.

Figure 7:
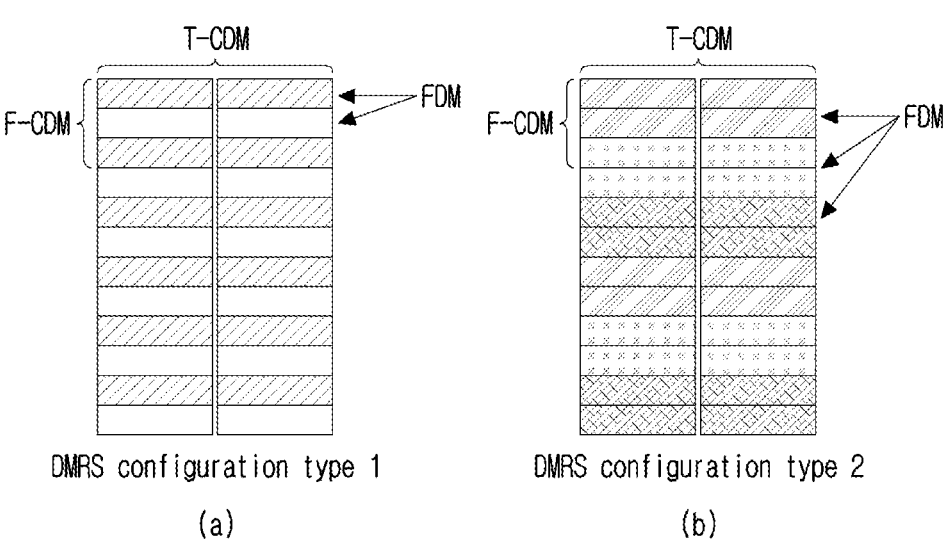
FIG. 7 illustrates a DM-RS configuration type in a wireless communication system to which the present disclosure can be applied.

FIG. 7 illustrates a DM-RS configuration type in a wireless communication system to which the present disclosure can be applied.

FIG. 7(a) illustrates DM-RS configuration type 1, and FIG. 7(b) illustrates DM-RS configuration type 2.

The DM-RS configuration type in FIG. 7 is configured by the dmrs-Type parameter in DMRS-DownlinkConfig IE in Table 6. DM-RS configuration type 1 has higher RS density in a frequency domain and supports up to 4(8) ports for a single(double)-symbol DM-RS. And, DM-RS configuration type 1 supports length 2 F-CDM and FDM for a single-symbol DM-RS, and supports length 2 F/T-CDM and FDM for a double-symbol DM-RS. DM-RS configuration type 2 supports more DM-RS antenna ports and supports up to 6 (12) ports for a single(double)-symbol DM-RS.

Table 6 is a table showing an example of DMRS-DownlinkConfig IE used to configure a downlink DM-RS for a PDSCH.

TABLE 6

```
-- ASN1START
-- TAG-DMRS-DOWNLINKCONFIG-START
DMRS-DownlinkConfig ::=    SEQUENCE {
    dmrs-Type                  ENUMERATED {type2}
OPTIONAL,   -- Need S
    dmrs-AdditionalPosition    ENUMERATED {pos0, pos1, pos3}
OPTIONAL,   -- Need S
    maxLength                  ENUMERATED {len2}
OPTIONAL,   -- Need S
    scramblingID0              INTEGER (0..65535)
OPTIONAL,   -- Need S
    scramblingID1              INTEGER (0..65535)
OPTIONAL,   -- Need S
    phase TrackingRS           SetupRelease { PTRS-
DownlinkConfig  }                OPTIONAL,   -- Need M
    ...
}
-- TAG-DMRS-DOWNLINKCONFIG-STOP
-- ASN1STOP
```

In Table 6, the dmrs-AdditionalPosition parameter indicates a position of an additional DM-RS in DL, and if the parameter does not exist, a UE applies the pos2 value. The Dmrs-Type parameter indicates selection of a DM-RS type to be used for DL, and if the parameter does not exist, a UE uses DM-RS type 1. The Max-Length parameter indicates the maximum number of OFDM symbols for a DL front loaded DM-RS, and len1 corresponds to a value of 1. The PhaseTrackingRS parameter configures a DL PTRS, and if the parameter does not exist or is canceled, a UE assumes that there is no DL PTRS.

For DM-RS configuration type 1,

If a UE is scheduled with one codeword and antenna port mapping is assigned indices of {2, 9, 10, 11 or 30}, or if a UE is scheduled with two codewords, the UE may assume that all remaining orthogonal antenna ports are not associated with the transmission of a PDSCH to other UEs.

For DM-RS configuration type 2,

If a UE is scheduled with one codeword and antenna port mapping is assigned indices of {2,10,23}, or if a UE is scheduled with two codewords, the UE may assume that all remaining orthogonal antenna ports are not associated with the transmission of a PDSCH to other UEs.

Figure 8:
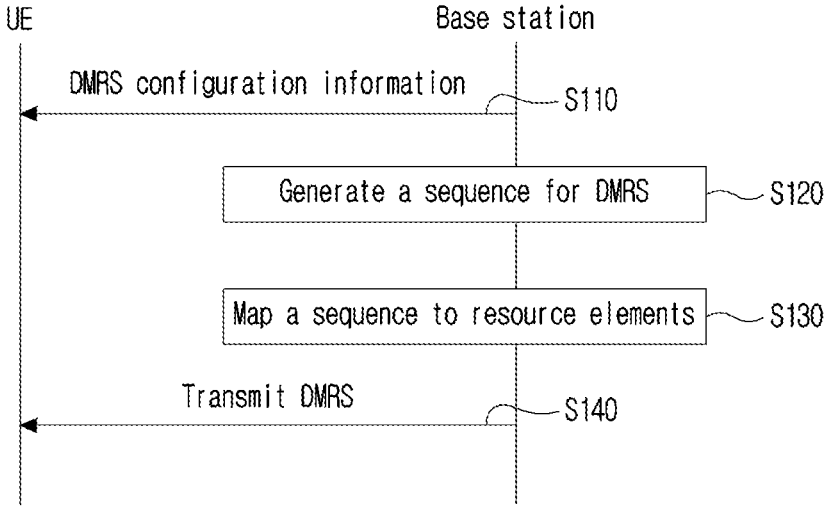
FIG. 8 illustrates a DL DM-RS transmission and reception procedure in a wireless communication system to which the present disclosure can be applied.

FIG. 8 illustrates a DL DM-RS transmission and reception procedure in a wireless communication system to which the present disclosure can be applied.

A base station transmits DM-RS configuration information to a UE (S110).

The DM-RS configuration information may refer to DMRS-DownlinkConfig IE. The DMRS-DownlinkConfig IE may include a dmrs-Type parameter, a dmrs-AdditionalPosition parameter, a maxLength parameter, a phaseTrackingRS parameter, etc. The dmrs-Type parameter is a parameter for selecting a DM-RS type to be used for DL.

In NR, DM-RS can be divided into two configuration types: (1) DM-RS configuration type 1 and (2) DM-RS configuration type 2. DM-RS configuration type 1 is a type that has higher RS density in a frequency domain, and DM-RS configuration type 2 is a type that has more DM-RS antenna ports. The dmrs-AdditionalPosition parameter is a parameter indicating a location of an additional DM-RS in DL. The first position of a front-loaded DM-RS is determined according to a PDSCH mapping type (type A or type B) and additional DM-RS may be configured to support high speed UEs. The front-loaded DM-RS occupies 1 or 2 consecutive OFDM symbols and is indicated by RRC signaling and downlink control information (DCI). The maxLength parameter is a parameter that indicates the maximum number of OFDM symbols for a DL front-loaded DM-RS. The phaseTrackingRS parameter is a parameter that configured a DL PTRS.

A base station generates a sequence used for a DM-RS (S120).

A sequence for a DM-RS is generated according to Equation 3 below.

$$r(n) = \frac{1}{\sqrt{2}}(1 - 2 \cdot c(2n)) + j\frac{1}{\sqrt{2}}(1 - 2 \cdot c(2n+1)) \qquad \text{[Equation 3]}$$

The pseudo-random sequence c(i) is defined in 3gpp TS 38.211 5.2.1. That is, c(i) may be a gold sequence of length-31 using two m-sequences. The pseudo-random sequence generator is initialized by Equation 4 below.

$$c_{init} = \left(2^{17}\left(N_{symb}^{slot}n_{s,f}^{\mu} + l + 1\right)\left(2N_{ID}^{n_{SCID}} + 1\right) + \\ 2N_{ID}^{n_{SCID}} + n_{SCID}\right) \bmod 2^{31} \qquad \text{[Equation 4]}$$

Here, l is the number of an OFDM symbol in a slot, and $n_{s,f}^{\mu}$ is a slot number in a frame.

In addition, $N_{ID}^{0}$, $N_{ID}^{1} \in \{0,1, \ldots, 65535\}$, if provided, when a PDSCH is scheduled by a PDCCH using DCI format 1_1 with a CRC scrambled by a C-RNTI, MCS-C-RNTI, or CS-RNTI, are given by higher layer parameters scramblingID0 and scramblingID1 in DMRS-DownlinkConfig IE, respectively.

$N_{ID}^{0} \in \{0,1, \ldots, 65535\}$, if provided, when a PDSCH is scheduled by a C-RNTI, MCS-C-RNTI, or Pa DCCH using DCI format 1_0 with a CRC scrambled by a CS-RNTI, is given by the higher layer parameter scramblingID0 in DMRS-DownlinkConfig IE.

$N_{ID}^{n\_SCID} = N_{ID}^{cell}$, otherwise, the quantity $n_{SCID} \in \{0,1\}$ is given by a DM-RS sequence initialization field in DCI associated with PDSCH transmission when DCI format 1_1 is used.

A base station maps the generated sequence to a resource element (S130). Here, the resource element may include at least one of time, frequency, antenna port, or code.

The base station transmits the DM-RS to a UE on the resource element (S140). The UE receives a PDSCH using the received DM-RS.

2) DM-RS for PUSCH

An DM-RS related operation for a PUSCH are described. As described above, UL refers to signal transmission (or communication) from a UE to a base station. An UL DM-RS related operation is similar to the DL DM-RS related operation described above, and the names of the parameters related to the DL can be replaced with the names of the parameters related to the UL.

That is, DMRS-DownlinkConfig IE can be replaced by DMRS-UplinkConfig IE, PDSCH mapping type can be replaced by PUSCH mapping type, and a PDSCH can be replaced by a PUSCH. And, in the DL DM-RS related operation, a base station can be replaced by a UE, and a UE can be replaced by a base station. Sequence generation for a UL DM-RS can be defined differently depending on whether transform precoding is enabled.

More specifically, when a DM-RS uses cyclic prefix orthogonal frequency division multiplexing (CP-OFDM) (or when transform precoding is not enabled), A PN sequence is used, and when using DFT-s-OFDM (Discrete Fourier Transform-spread-OFDM) (when transform precoding is enabled), a ZC sequence with a length of 30 or more is used.

Table 7 is a table showing an example of DMRS-UplinkConfig IE used to configure an uplink DM-RS for a PUSCH.

parameter does not exist, a UE applies the pos2 value. The Dmrs-Type parameter indicates selection of a DM-RS type to be used for UL, and if the parameter does not exist, a UE uses DM-RS type 1. The Max-Length parameter indicates the maximum number of OFDM symbols for a UL front loaded DM-RS, and len1 corresponds to a value of 1. The PhaseTrackingRS parameter configures a UL PTRS. The tranformPrecodingdisabled parameter represents DM-RS related parameters for Cyclic Prefix OFDM, and the transformPrecodingEnabled parameter represents DM-RS related parameters for DFT-s-OFDM (Transform Precoding).

Hereinafter, the UE's DM-RS transmission procedure is described in more detail.

If the transmitted PUSCH is not scheduled by DCI format 0_1 with a CRC scrambled by a C-RNTI, CS-RNTI, or MCS-C-RNTI and does not correspond to a configured grant, a UE uses a single symbol front-loaded DM-RS of configuration type 1 in DM-RS port 0. And, the remaining REs not used for a DM-RS in the above symbols are not used for any PUSCH transmission except a PUSCH with an allocated duration of 2 or less OFDM symbols with disabled transform precoding. Additional DM-RS can be transmitted according to a scheduling type and a PUSCH duration period, considering whether frequency hopping is enabled.

When frequency hopping is disabled: A UE assumes that dmrs-AdditionalPosition is equal to 'pos2' and up to 2 additional DM-RSs can be transmitted according to a PUSCH duration period.

When frequency hopping is enabled: A UE assumes that dmrs-AdditionalPosition is equal to 'pos1' and that up to one additional DM-RS can be transmitted according to a PUSCH duration period.

TABLE 7

```
-- ASN1START
-- TAG-DMRS-UPLINKCONFIG-START
DMRS-UplinkConfig ::=              SEQUENCE {
   dmrs-Type                          ENUMERATED {type2}
OPTIONAL,  -- Need S
   dmrs-AdditionalPosition            ENUMERATED {pos0, pos1, pos3}
OPTIONAL,  -- Need S
   phaseTrackingRS                    SetupRelease { PTRS-UplinkConfig }
OPTIONAL,  -- Need M
   maxLength                          ENUMERATED {len2}
OPTIONAL,  -- Need S
   transformPrecodingDisabled      SEQUENCE {
      scramblingID0                      INTEGER (0..65535)
OPTIONAL,  -- Need S
      scramblingID1                      INTEGER (0..65535)
OPTIONAL,  -- Need S
      ...
   }
OPTIONAL,  -- Need R
   transformPrecodingEnabled       SEQUENCE {
      nPUSCH-Identity                    INTEGER(0..1007)
OPTIONAL,  -- Need S
      sequenceGroupHopping               ENUMERATED {disabled}
OPTIONAL,  -- Need S
      sequenceHopping                    ENUMERATED {enabled}
OPTIONAL,  -- Need S
      ...
   }
OPTIONAL,  -- Need R
   ...
}
-- TAG-DMRS-UPLINKCONFIG-STOP
-- ASN1STOP
```

In Table 7, the dmrs-AdditionalPosition parameter indicates a position of an additional DM-RS in UL, and if the When the transmitted PUSCH is scheduled by activation DCI format 0_0 with CRC scrambled by a CS-RNTI, a UE may use a single symbol front-loaded DM-RS of the configuration type provided by the higher layer parameter dmrs-Type of configuredGrantConfig on DM-RS port 0, the remaining REs not used for a DM-RS in the symbols may be not used for any PUSCH transmission except a PUSCH with an allocated duration of not more than 2 OFDM symbols with transformed transform precoding disabled, and an additional DM-RS with dmrs-AdditionalPosition from configuredGrantConfig may be transmitted based on a scheduling type and a PUSCH duration interval in consideration of whether frequency hopping is enabled.

When the transmitted PUSCH corresponds to a grant scheduled or configured by DCI format 0_1 with a CRC scrambled by s C-RNTI, CS-RNTI or MCS-RNTI, A UE can be configured with the higher layer parameter dmrs-Type in DMRS-UplinkConfig, and the configured DM-RS configuration type is used for PUSCH transmission.

A UE can be configured with the maximum number of front-loaded DM-RS symbols for a PUSCH by the higher layer parameter maxLength in DMRS-UplinkConfig.

If a UE transmitting a PUSCH is configured with the higher layer parameter phaseTrackingRS in DMRS-UplinkConfig, the UE can assume that the following configurations do not occur simultaneously for the transmitted PUSCH.

For DM-RS configuration type 1 and type 2, any of 4-7 or 6-11 DM-RS ports are scheduled for a UE, respectively, and a PT-RS is transmitted from the UE.

For a PUSCH scheduled by DCI format 0_1, by activating DCI format 0_1 with CRC scrambled by a CS-RNTI or by configured grant Type 1, a UE assumes that a DM-RS CDM group is not used for data transmission.

Method of Transmitting and Receiving Reference Signal

Active research is currently underway in the fields of AI (Artificial intelligence)/ML (Machine learning)/DL (Deep learning). For example, methods to improve performance by applying AI/ML/DL algorithms are being studied in various fields such as natural language processing, speech recognition, and low-quality image recovery. In the wireless communication field, many studies are being conducted to provide superior performance compared to existing system performance by applying AI/ML/DL algorithms. As one part, research is being conducted on how to apply AI/ML/DL algorithms to the channel estimation part and thereby reduce RS overhead while providing better performance. In the present disclosure, based on AI/ML/DL algorithms, etc., a method to provide an improved RS pattern for a base stations/UE that can provide good performance even at lower frequency domain (FD)/time domain (TD) densities compared to the existing RS (e.g., DM-RS) pattern.

Hereinafter, in the present disclosure, L1 (layer 1) signaling may mean DCI-based dynamic signaling between a base station and a UE, and L2 (layer 2) signaling may refer to higher layer signaling based on an RRC/MAC control element (CE: control element) between a base station and a UE.

Additionally, in the present disclosure, a DM-RS antenna port or DM-RS port may be interpreted to have the same meaning. In addition, a port number illustrated as a DM-RS antenna port or DM-RS port corresponds to one example and the present disclosure is not interpreted as being limited thereto.

In the present disclosure, for example, based on AI/ML/DL implementation, etc. a method in which a UE reports its preferred RS density (e.g., frequency/time density) to a base station, and a method in which a base station configures/indicates a specific RS pattern based on the reported value are proposed.

Embodiment #A1: In relation to PDSCH/PUSCH DM-RS, a plurality of sub-CDM groups within a single code division multiplexing (CDM) group may be defined.

Here, a CDM group may refer to a group of antenna ports sharing the same resource element (RE) to which a DM-RS is mapped without data. The number of CDM groups may be indicated by DCI (e.g., antenna port field), and the values 1, 2, and 3 of the number of CDM groups without data may represent CDM groups {0}, {0,1}, and {0,1,2}, respectively.

Here, a Sub-CDM group may be defined as the (minimum) unit of an RE group to which a FD-OCC (frequency domain-orthogonal cover code) is applied within a single CDM group. For example, a sub-CDM group may be defined for each RE group to which a FD-OCC is applied, and x number of RE groups to which a FD-OCC is applied (x is a natural number of 2 or more) may be grouped and then a sub-CDM group may be defined for each grouped RE group.

Additionally, one or more Sub-CDM groups may be defined within a single CDM group. For example, the number of sub-CDM groups within a single CDM group may be predefined/determined or configured/indicated by a base station (e.g., L2/L1 signaling).

Additionally, a plurality of grouping methods with different numbers of sub-CDM groups within a single CDM group may be defined. For example, DM-RS REs may be grouped to define 2 sub-CDM groups or 4 sub-CDM groups within a single CDM group. When multiple grouping methods within a single CDM group are defined, a sub-CDM grouping index for each grouping method may be defined. In addition, a sub-CDM grouping index may be configured/indicated (e.g., L2/L1 signaling) for a UE by a base station. This will be described in more detail with reference to FIG. 9.

Additionally, a sub-CDM group may be defined to have a repeating pattern in specific PRB units (e.g., 2PRBs). For example, different sub-CDM grouping indexes may be configured/indicated for each specific PRB(s).

FIG. 9 illustrates a CDM group according to one embodiment of the present disclosure.

FIG. 9(a) illustrates a CDM group when DM-RS configuration type 1 is configured for a DM-RS pattern in a frequency domain, and FIG. 9(b) illustrates a CDM group when DM-RS configuration type 2 is configured for a DM-RS pattern in a frequency domain.

In addition, in FIG. 9, it may be interpreted as a single-symbol DM-RS for convenience of explanation, but the present disclosure is not limited thereto, and the methods proposed in the present disclosure can be equally applied to a double-symbol DM-RS.

Additionally, FIG. 9 illustrates a DM-RS mapping pattern in one resource block in a frequency domain. That is, a mapping pattern (i.e., shaded boxes) of an RS in 24 subcarriers (SC) (or RE) with indexes 0 to 23 is illustrated. Here, an RS pattern (i.e., shaded boxes) indicates a subcarrier (or RE) to which a DM-RS is mapped (carrying a DM-RS).

Referring to FIG. 9(a), it illustrates CDM groups according to sub-CDM grouping indexes (this name corresponds to an example, and a different name may be used if it is an index that can distinguish a CDM group) 0, 1, 2, and 3.

Sub-CDM grouping index 0 indicates that the number of sub-CDM groups is 0. In other words, it represents a single CDM group. In this case, multiple DM-RS ports may be supported based on a CDM group. That is, DM-RSs of different antenna ports can be mapped to the same REs according to an RS pattern for a CDM group using a CDM method. For example, DM-RSs of antenna port p (p is a natural number) and p+1 can be mapped to an RS pattern for CDM group #0 using a CDM method.

Sub-CDM grouping index 1 indicates when the number of sub-CDM groups is 2. In this case, multiple DM-RS ports can be supported based on a sub-CDM group. That is, DM-RSs of different antenna ports can be mapped to the same REs according to an RS pattern for each sub-CDM group using a CDM method. For example, DM-RSs of antenna port p (p is a natural number) and p+1 can be mapped to an RS pattern for CDM sub-group #0 using a CDM method, and DM-RSs of antenna ports p+2 and p+3 can be mapped to an RS pattern for CDM sub-group #1 using a CDM method. Additionally, for example, since the number of Sub-CDM groups is 2, twice as many DM-RS antenna ports can be supported as in the case of sub-CDM grouping index 0.

Sub-CDM grouping index 2 indicates that the number of sub-CDM groups is 3. In this case, multiple DM-RS ports can be supported based on a sub-CDM group. That is, DM-RSs of different antenna ports can be mapped to the same REs according to an RS pattern for each sub-CDM group in a CDM method. For example, DM-RSs of antenna port p (p is a natural number) and p+1 can be mapped to an RS pattern for CDM sub-group #0 using a the CDM method, DM-RSs of antenna ports p+2 and p+3 can be mapped to an RS pattern for CDM sub-group #1 in a CDM method, and DM-RSs of antenna ports p+4 and p+5 can be mapped to an RS pattern for CDM sub-group #2 using a CDM method. Additionally, for example, since the number of sub-CDM groups is 3, three times as many DM-RS antenna ports as in the case of sub-CDM grouping index 0 can be supported.

Sub-CDM grouping index 3 indicates that the number of sub-CDM groups is 6. In this case, multiple DM-RS ports can be supported based on a sub-CDM group. That is, DM-RSs of different antenna ports can be mapped to the same REs according to an RS pattern for each sub-CDM group using a CDM method. For example, DM-RSs of antenna port p (p is a natural number) and p+1 can be mapped to an RS pattern for CDM sub-group #0 using a CDM method, DM-RSs of antenna ports p+2 and p+3 can be mapped to an RS pattern for CDM sub-group #1 using a CDM method, DM-RSs of antenna ports p+4 and p+5 can be mapped to an RS pattern for CDM sub-group #2 using a CDM method, DM-RSs of antenna ports p+6 and p+7 can be mapped to an RS pattern for CDM sub-group #3 using a CDM method, DM-RSs of antenna ports p+8 and p+9 can be mapped to an RS pattern for CDM sub-group #4 using a CDM method, and DM-RSs of antenna ports p+10 and p+11 can be mapped to an RS pattern for CDM sub-group #5 using a CDM method. Additionally, for example, since the number of sub-CDM groups is 6, 6 times more DM-RS antenna ports can be supported than in the case of sub-CDM grouping index 0.

Referring to FIG. 9(b), it illustrates CDM groups according to sub-CDM grouping indexes (this name corresponds to an example, and a different name may be used if it is an index that can distinguish a CDM group) 0, 1, and 2.

Sub-CDM grouping index 0 indicates that the number of sub-CDM groups is 0. In other words, it represents a single CDM group. In this case, multiple DM-RS ports may be supported based on a CDM group. That is, DM-RSs of different antenna ports can be mapped to the same REs according to an RS pattern for a CDM group using a CDM method. For example, DM-RSs of antenna port p (p is a natural number) and p+1 can be mapped to an RS pattern for CDM group #0 using a CDM method.

Sub-CDM grouping index 1 indicates when the number of sub-CDM groups is 2. In this case, multiple DM-RS ports can be supported based on a sub-CDM group. That is, DM-RSs of different antenna ports can be mapped to the same REs according to an RS pattern for each sub-CDM group using a CDM method. For example, DM-RSs of antenna port p (p is a natural number) and p+1 can be mapped to an RS pattern for CDM sub-group #0 using a CDM method, and DM-RSs of antenna ports p+2 and p+3 can be mapped to an RS pattern for CDM sub-group #1 using a CDM method. Additionally, for example, since the number of Sub-CDM groups is 2, twice as many DM-RS antenna ports can be supported as in the case of sub-CDM grouping index 0.

Sub-CDM grouping index 2 indicates that the number of sub-CDM groups is 4. In this case, multiple DM-RS ports can be supported based on a sub-CDM group. That is, DM-RSs of different antenna ports can be mapped to the same REs according to an RS pattern for each sub-CDM group in a CDM method. For example, DM-RSs of antenna port p (p is a natural number) and p+1 can be mapped to an RS pattern for CDM sub-group #0 using a the CDM method, DM-RSs of antenna ports p+2 and p+3 can be mapped to an RS pattern for CDM sub-group #1 in a CDM method, DM-RSs of antenna ports p+4 and p+5 can be mapped to an RS pattern for CDM sub-group #2 using a CDM method, and DM-RSs of antenna ports p+6 and p+7 can be mapped to an RS pattern for CDM sub-group #3 using a CDM method. Additionally, for example, since the number of sub-CDM groups is 4, four times as many DM-RS antenna ports as in the case of sub-CDM grouping index 0 can be supported.

Additionally, a UE may report the preferred number of sub-CDM groups among the number of sub-CDM groups within a CDM group to a base station. For example, in FIG. 9(a) and/or FIG. 9(b), an index of a grouping method preferred by a UE among the sub-CDM grouping indexes may be reported to a base station. In addition, or as an alternative to this, a UE may report a location of an RE to which a preferred RS is mapped and/or information on an RE to which an RS is mapped to a base station. For example, assuming that subcarrier (or RE) indexes for a frequency region configured/indicated to a UE are 0, 2, 4, 6, 8, 10, 12, 14, 16, 18, 20, 22, the UE can report information on 0, 2, 4, and 6, which indicates the preferred subcarrier (or RE), to a base station.

Additionally, a base station may configure/indicate a UE on the number of sub-CDM groups in a CDM group (e.g. sub-CDM grouping index) and/or a sub-CDM group index based on the report (report value) of a UE. Here, a base station may configure a UE semi-statically (e.g. by RRC/ MAC CE) and/or dynamically indicate it (e.g., by DCI).

According to the proposed method(s) described above, since the variable frequency density is defined in CDM group units defined in the current standard, multiplexing (e.g., multi-user (MU) pairing) is possible based on different CDM groups even for UEs that do not support AI/ML/DL implementation.

Additionally, when defining multiple grouping methods with different numbers of sub-CDM groups within a single CDM group (for example, see FIG. 9), flexible RS density can be provided to UEs with different implementations.

Embodiment #A2: A specific DM-RS pattern can be configured/indicated to a UE among the 'original DM-RS pattern' defined in the current standard and the 'optimized DM-RS pattern' (e.g., DM-RS pattern illustrated in Embodiments #A1 and #A3) with lower RS overhead.

Here, the 'original DM-RS pattern' and 'optimized DM-RS pattern' correspond to one example, and the present disclosure is not limited thereto. That is, a base station can configure/indicate a specific DM-RS pattern among a first DM-RS pattern with relatively higher RS overhead and a second DM-RS pattern with relatively lower RS overhead to a UE. And/or, the base station may configure/indicate the UE whether to perform rate matching of a sub-CDM group related to the second DM-RS pattern.

Here, when the base station indicates DM-RS port(s) related to SU (single user) transmission to the UE (e.g., antenna port indication within DCI for scheduling PDSCH/PUSCH), a DM-RS is transmitted based on the second DM-RS pattern (e.g., 'optimized DM-RS pattern'), and data (e.g., PDSCH/PUSCH) may be transmitted to sub-CDM group(s) other than the sub-CDM group(s) to which the DM-RS is transmitted (mapped).

In addition, when the base station indicates DM-RS port(s) related to MU (multi-user) transmission for the UE (e.g., antenna port indication within DCI for scheduling PDSCH/PUSCH), a DM-RS is transmitted based on the second DM-RS pattern (e.g., 'optimized DM-RS pattern'), and data (e.g., PDSCH/PUSCH) may not be transmitted to sub-CDM group(s) other than the sub-CDM group(s) to which the DM-RS is transmitted (mapped) (e.g., by rate matching, muting, etc. for PDSCH/PUSCH).

In addition, if the base station indicates DM-RS port(s) related to MU transmission to the UE (e.g., antenna port indication within DCI scheduling PDSCH/PUSCH), a DM-RS may be transmitted based on the first DM-RS pattern (e.g., 'original DM-RS pattern').

In addition, contrary to the above, if the base station indicates DM-RS port(s) related to SU transmission to the UE (e.g., antenna port indication within DCI scheduling PDSCH/PUSCH), a DM-RS may be transmitted based on the first DM-RS pattern (e.g., 'original DM-RS pattern').

In addition, with respect to the above-described proposed methods, when the base station configures/indicates the UE to configure/indicate the second DM-RS pattern (e.g., 'optimized DM-RS pattern'), the number and/or index of sub-CDM groups in which data (e.g., PDSCH/PUSCH) is not transmitted (e.g., by rate matching, muting, etc.) may be configured (e.g. by RRC, MAC CE)/indicated (e.g., by DCI) to the UE. For example, among sub-CDM group(s) other than the sub-CDM group(s) to which the DM-RS is transmitted (mapped), data (e.g., PDSCH/PUSCH) may not be transmitted in some sub-CDM group(s).

Additionally, regarding the proposed methods of Embodiment 2 described above, DM-RS port(s) related to SU transmission and/or DM-RS port(s) related to MU transmission may be explicitly configured to a UE by a base station. For example, DM-RS port(s) related to SU transmission and DM-RS port(s) related to MU transmission may be configured for each UE. Alternatively, if the DM-RS port(s) related to SU transmission are configured for a UE, the UE may recognize that the remaining DM-RS ports are related to MU transmission. Alternatively, conversely, if the DM-RS port(s) related to MU transmission are configured for a UE, the UE may recognize that the remaining DM-RS ports are related to SU transmission.

In addition, for the proposed methods of Embodiment #A2, the DM-RS port(s) related to SU transmission and/or the DM-RS port(s) related to MU transmission can be implicitly recognized by a UE. For example, if certain conditions are met, a UE may recognize that the DM-RS port(s) indicated (i.e., by the PDSCH/PUSCH scheduling DCI) are associated with SU transmission or are associated with MU transmission. Additionally, for example, DM-RS port(s) related to SU transmission may correspond to DM-RS antenna port(s) with guaranteed SU transmission defined in the current standard, as shown in Table 8 below. In other words, to support Embodiment 2 above, for the DM-RS antenna port(s) (combination) specified in Table 8 below, a UE may recognize the DM-RS port(s) related to SU transmission and perform the methods proposed in Embodiment #A2, and the UE may recognize other DM-RS antenna port(s) as DM-RS port(s) related to MU transmission and perform the methods proposed in Embodiment 2.

Table 8 illustrates the DM-RS antenna port(s) related to SU transmission currently defined in TS 38.214.

TABLE 8

For DM-RS configuration type 1,
if a UE is scheduled with one codeword and assigned with the antenna port mapping with indices of {2, 9, 10, 11 or 30} in Table 9 and Table 11, or
if a UE is scheduled with one codeword and assigned with the antenna port mapping with indices of {2, 9, 10, 11 or 12} in Table 10 and {2, 9, 10, 11, 30 or 31} in Table 12, or
if a UE is scheduled with two codewords,
the UE may assume that all the remaining orthogonal antenna ports are not associated with transmission of PDSCH to another UE.
For DM-RS configuration type 2,
if a UE is scheduled with one codeword and assigned with the antenna port mapping with indices of {2, 10 or 23} in Table 13 and Table 15, or
if a UE is scheduled with one codeword and assigned with the antenna port mapping with indices of {2, 10, 23 or 24} in Table 14 and {2, 10, 23 or 58} in Table 16, or
if a UE is scheduled with two codewords,
the UE may assume that all the remaining orthogonal antenna ports are not associated with transmission of PDSCH to another UE.

Table 9 and Table 10 illustrate the antenna port(s) (1000+ DMRS port) of DM-RS when dmrs-Type=1, maxLength=1.

TABLE 9

| One Codeword: Codeword 0 enabled, Codeword 1 disabled | | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 10

| One Codeword: Codeword 0 enabled, Codeword 1 disabled) | | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |

TABLE 10-continued

One Codeword: Codeword 0 enabled, Codeword 1 disabled)

| Value | Number of DMRS CDM group(s) without data | DMRS port(s) |
|---|---|---|
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |

TABLE 10-continued

One Codeword: Codeword 0 enabled, Codeword 1 disabled)

| Value | Number of DMRS CDM group(s) without data | DMRS port(s) |
|---|---|---|
| 12 | 2 | 0, 2, 3 |
| 13-15 | Reserved | Reserved |

Table 11 and Table 12 illustrate the antenna port(s) (1000+DMRS port) of DM-RS when dmrs-Type=1. maxLength=2.

TABLE 11

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 12

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, | 2 |

TABLE 12-continued

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | 2 | 0, 2, 3 | 1 | | | | |

Table 13 and Table 14 illustrate the antenna port(s) (1000+DMRS port) of DM-RS when dmrs-Type=2. max-Length=1.

TABLE 13

| | One Codeword: Codeword 0 enabled, Codeword 1 disabled | | | Two Codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |

TABLE 13-continued

| | One Codeword: Codeword 0 enabled, Codeword 1 disabled | | | Two Codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 21 | 3 | 3-5 | | | |
| 22 | 3 | 0-3 | | | |
| 23 | 2 | 0, 2 | | | |
| 24-31 | Reserved | Reserved | | | |

TABLE 14

| | One Codeword: Codeword 0 enabled, Codeword 1 disabled | | | Two Codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |

TABLE 14-continued

| One [a] Codeword: Codeword 0 enabled, Codeword 1 disabled | | | Two Codewords: Codeword 0 enabled, Codeword 1 enabled | | |
|---|---|---|---|---|---|
| Value | Number of DMRS CDM group(s) without data | DMRS port(s) | Value | Number of DMRS CDM group(s) without data | DMRS port(s) |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24 | 2 | 0, 2, 3 | | | |
| 25-31 | Reserved | Reserved | | | |

Table 15 and Table 16 illustrate the antenna port(s) (1000+DMRS port) of DM-RS when dmrs-Type=2. max-Length=2.

TABLE 15

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |

TABLE 15-continued

| | One Codeword: Codeword 0 enabled, Codeword 1 disabled | | | | Two Codewords: Codeword 0 enabled, Codeword 1 enabled | | |
| Value | Number of DMRS CDM group(s) without data | DMRS port(s) | Number of front-load symbols | Value | Number of DMRS CDM group(s) without data | DMRS port(s) | Number of front-load symbols |
|---|---|---|---|---|---|---|---|
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

TABLE 16

| | One [2] Codeword: Codeword 0 enabled, Codeword 1 disabled | | | | Two [2] Codewords: Codeword 0 enabled, Codeword 1 enabled | | |
| Value | Number of DMRS CDM group(s) without data | DMRS port(s) | Number of front-load symbols | Value | Number of DMRS CDM group(s) without data | DMRS port(s) | Number of front-load symbols |
|---|---|---|---|---|---|---|---|
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |

TABLE 16-continued

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58 | 2 | 0, 2, 3 | 1 | | | | |
| 59-63 | Reserved | Reserved | Reserved | | | | |

According to the proposed method(s) described above, when applying the second DM-RS pattern (e.g., 'optimized DMRS pattern') in SU transmission, since DMRS overhead can be reduced, by applying the second DM-RS pattern (e.g., 'optimized DMRS pattern') and transmitting data (e.g., PDSCH/PUSCH) in other sub-CDM group areas, throughput can be improved from the UE's perspective.

In addition, even when applying the second DM-RS pattern (e.g., 'optimized DMRS pattern') in MU transmission, since rate matching/muting must be performed for a DMRS that can be transmitted to other UEs, there is a problem that it is difficult to help improve throughput from the UE's perspective. Therefore, in the case of MU transmission, a method that helps channel estimation performance can be considered by applying the first DM-RS pattern (e.g., 'original DMRS pattern') and transmitting many RSs as before.

Alternatively, for RB group A, which is composed of N or more consecutive RBs among the RBs allocated/scheduled to a UE, and RB group B, which means/corresponds to RBs that are not, the second DM-RS pattern (e.g., 'optimized DM-RS pattern') may be applied to RB group A, and the first DM-RS pattern (e.g., 'original DM-RS pattern') may be applied to RB group B.

Here, in the above proposal, the 'N' value may be configured/indicated by a base station, and/or a UE may feed back related information, and/or may be defined as a fixed value. If the N value is defined as a fixed value, the N value may be defined for each numerology such as subcarrier spacing.

Based on the N value, frequency domain density of a sub-CDM group for the second DM-RS pattern ('optimized DM-RS pattern') can be configured/defined. For example, the larger the N value, the lower the density of DM-RS, because a large number of REs can be used for channel estimation purposes. Therefore, the larger the N value, the lower the frequency domain density of the sub-CDM group.

As above, in the case of RB group A composed of continuous RBs, channel estimation is easy even when RS density is reduced, so throughput can be improved by applying an optimized DM-RS pattern with low RS overhead.

Additionally, the second DM-RS pattern (e.g., 'optimized DM-RS pattern') and the first DM-RS pattern (e.g., 'original DM-RS pattern') may be adaptively applied based on the frequency region scheduled for a UE.

For example, the second DM-RS pattern (e.g., 'optimized DM-RS pattern') may be applied to a specific frequency region A, and the first DM-RS pattern (e.g., 'original DM-RS pattern') may be applied to the remaining frequency region B.

Here, the 'frequency region' may be configured/indicated by a base station, and/or a UE may feed back related information, and/or may be defined as a fixed value. If the 'frequency region' is defined as a fixed value, the 'frequency region' can be defined by numerology such as subcarrier spacing.

For the specific frequency region A, frequency domain density of a sub-CDM group for the second DM-RS pattern (e.g., 'optimized DM-RS pattern') based on the allocated/scheduled RB number M value can be defined. For example, the larger the M value, the lower the density of a DM-RS, because a large number of REs can be used for channel estimation purposes. Therefore, the larger the M value, the lower the frequency domain density of the sub-CDM group.

As above, by dividing the frequency region and individually configuring the DM-RS pattern, MU with the legacy UE can be efficiently performed by dividing the frequency region.

In the method(s) described above, a subgroup index for rate matching may be indicated through a DMRS field of DCI.

In addition, the second DM-RS pattern (e.g., 'optimized DM-RS pattern') and the first DM-RS pattern (e.g., 'original DM-RS pattern') can be adaptively applied based on a size of the allocated/scheduled RB scheduled for a UE.

For example, if a size of the allocated/scheduled RB scheduled for a UE is greater than or equal to M, the 'second DM-RS pattern' (e.g., 'optimized DM-RS pattern') may be applied, and in case of less than/less than M, 'the first DM-RS pattern (e.g., 'original DM-RS pattern') may be applied.

Here, the 'M' value may be configured/indicated by a base station, and/or a UE may feed back related information, and/or may be defined as a fixed value. If the 'M' value is defined as a fixed value, the 'M' value can be defined for each numerology, such as subcarrier spacing.

For the above method, the frequency domain density of a sub-CDM group in the 'second DM-RS pattern (e.g., 'optimized DM-RS pattern') is defined based on the allocated/scheduled RB number M value. For example, the larger the M value, the lower the density of DM-RS, because a large number of REs can be used for channel estimation purposes. Therefore, the larger the M value, the lower the frequency domain density of the sub-CDM group.

By determining a DM-RS pattern according to a size of the allocated/scheduled RB scheduled for a UE, the DM-RS pattern can be implicitly determined, so the UE's reporting can be omitted.

Embodiment #A3: In relation to a PDSCH/PUSCH DM-RS, a method of defining/configuring the number of front-loaded DM-RS symbols and/or the number of additional DM-RS symbols is proposed.

A UE may report its preferred number of additional DM-RS symbols to a base station. For example, a UE can report its preferred number of additional DM-RS symbols to a base station through UE's capability.

For example, in the case of a UE that can optimize the number of DM-RS symbols in a time domain based on AI/ML/DL algorithms, etc., it can report its preferred number of additional DM-RS symbols to a base station.

In addition, based on the report (e.g. reporting value) from a UE, a base station may configure (e.g. by RRC, MAC CE)/indicated (e.g., by DCI) the UE an 'the number of optimized additional DM-RSs' (hereinafter referred to as the number of second additional DM-RS symbols) that is distinct from the number of additional DM-RS symbols (i.e., higher layer parameter dmrs-AdditionalPosition) (hereinafter referred to as the number of first additional DM-RS symbols) defined in the existing standard.

Here, the number of the second additional DM-RS symbols (e.g., 'the number of optimized additional DM-RSs') may be configured (e.g. by RRC, MAC CE)/indicated to a UE (e.g., in DCI) using a higher layer parameter different from the existing higher layer parameter (i.e., higher layer parameter dmrs-AdditionalPosition) for configuring the number of additional DM-RS symbols (i.e., number of first additional DM-RS symbols). And/or, the number of second additional DM-RS symbols (e.g., 'the number of optimized additional DM-RSs') may be defined as a fixed and agreed value between a base station and a UE.

Additionally, when a base station indicates, to a UE, DM-RS port(s) related to SU transmission (e.g., by PDSCH/PUSCH scheduling DCI), the UE refers to the number of second additional DM-RS symbols (e.g., 'the number of optimized additional DM-RSs'), and when a base station indicates, to a UE, DM-RS port(s) related to MU transmission, the UE may refer to the number of first additional DM-RS symbols (i.e., the existing 'number of additional DM-RSs').

By separately defining 'the number of optimized additional DM-RS symbols' preferred by a specific UE and 'the existing number of additional DM-RS symbols', only in the case of SU transmission, it can be defined/configured to refer to 'the number of optimized additional DM-RSs'. Therefore, in the case of SU transmission, it can have low RS overhead and thus improve the throughput of a UE, and in the case of MU transmission, MU-paring can be performed with a UE that does not support 'the number of optimized additional DM-RSs'.

In addition, when a base station indicates, to a UE, DM-RS port(s) related to SU transmission, the number of front-loaded DM-RS symbols can be defined/configured to be 1. And/or a time domain-orthogonal cover code (TD-OCC) may not be applied (i.e., off).

Configuring/indicating a front-loaded DM-RS to 2 symbols can be considered to increase the number of MU-paring UEs based on multiple DM-RS ports. On the other hand, when DM-RS port(s) related to SU transmission are indicated to a specific UE, since the UE is not included in MU-pairing UEs, throughput can be improved from the UE's perspective by optimizing a DM-RS pattern to lower RS overhead.

Proposal #A3-5: A UE may report to a base station time information associated with a specific number of additional DM-RS symbols (e.g., the number of first additional DM-RS symbols, the number of second additional DM-RS symbols) and/or a specific TD/FD density of a DM-RS (e.g., the number of sub-CDM groups), and/or a specific DM-RS pattern (e.g., the first DM-RS pattern, the second DM-RS pattern).

Here, the 'time information' may mean duration information (e.g. number of slots, number of symbols, absolute time unit, etc.) to which the specific number of additional DM-RSs, and/or the specific TD/FD density of the DM-RS, and/or a specific DM-RS pattern can be applied, and/or start/end points, etc.

In this way, a base station/UE can predict an optimal DM-RS pattern according to the mobility of a UE based on the AI/ML/DL algorithm and use the optimal pattern during a corresponding time duration.

In the above proposal, the number of front-loaded DM-RS symbols, the number of additional DM-RS symbols can be configured by parameters that have the same effect on a DM-RS pattern, which can be configured as maxLength and dmrs-AdditionalPosition in the current standard, respectively.

Embodiment #A4: By defining a sub-port group within a CDM group, whether an interference port is transmitted/used can be configured/indicated.

In relation to a PDSCH/PUSCH DM-RS, multiple sub-port groups within a single CDM group may be defined/configured.

An example of defining a sub-port group is as follows. If maxLength=2 is configured in the current standard, up to 4 ports can be multiplexed within a single CDM group. In this case, each sub-port group composed of two ports can be defined. For example, in the case of DM-RS configuration type 1 (Config-Type1), ports 0, 1, 4, and 5 may be included in a single CDM group, {0,1} (or {0,4}) port may be defined/configured as sub-port group #0, and {4,5} (or {1,5}) port may be defined/configured as sub-port group #1, respectively.

As above, with a sub-port group defined/configured, a base station can configure/indicate a UE to configure/indicate a sub-port group including an interference port.

Here, the 'interference port' may refer to a port used to transmit data to another UE.

For example, in order to configure/indicate the 'sub-port group' to a UE, the number and/or index of the sub-port group can be configured/indicated to the UE.

In the current standard, information on an interference port can be indicated to a UE in units of CDM groups. Therefore, additional UE implementation must be supported to find a specific interference port within a CDM group. On the other hand, when applying the proposed method above, it is possible to indicate information on an interfering port to a UE in units of sub-port groups within a CDM group, thereby reducing the complexity of the UE's implementation. In addition, since indicates may not be given on a port basis, the signaling overhead required for indicating an interference port can be reduced.

The method(s) in the above-described embodiment #A1/A2/A3/A4 may be applied independently, and/or one or more embodiments (or methods) may be applied in combination.

In addition, in the above-described embodiment #A1/A2/A3/A4 (also, method(s) in the corresponding embodiment), the 'optimized DM-RS pattern' may mean a DM-RS pattern with adaptively adjusted RS density.

In addition, in the above-described embodiment #A1/A2/A3/A4 (also method(s) in the corresponding embodiment), 'sub-CDM group' is an example of a name/method used to adaptively control RS density, the methods proposed in this disclosure are not limited. In addition to or instead of the 'sub-CDM group', it may also be referred to as a time/frequency offset, time/frequency density, etc. For example, in FIG. 9(a), in the case of sub-CDM group index=1, the frequency density may correspond to 3 (i.e., there are 3 DM-RS RE groups per 1 RB based on 2 RE units) or 6 (i.e., there are 6 DM-RS REs per 1 RB based on 1 RE unit). Similarly, in FIG. 9(a), in the case of sub-CDM group index=2, the frequency density may correspond to 2 (i.e., there are 2 DM-RS RE groups per 1 RB based on 2 RE units) or 4 (i.e., there are 4 DM-RS REs per 1 RB based on 1 RE unit). As another example, in the case of sub-CDM group index=1 in FIG. 9(a), a frequency offset may correspond to 8 subcarriers (or RE). Similarly, in the case of sub-CDM group index=2 in FIG. 9(a), a frequency offset may correspond to 12 subcarriers (or RE), and in the case of sub-CDM group index=2, it may correspond to 24 subcarriers (or RE).

In addition, the above-described embodiment #A1/A2/A3/A4 (also the method(s) in the embodiment) includes a process where a UE reports related information to a base station, however a method of omitting the reporting of a UE and defining a base station to perform the proposed method alone can also be applied. For example, it is possible to use information that a base station can obtain on its own, such as uplink reciprocity, without a special report from a UE, and decide whether/how to apply the above-mentioned method based on the information acquired by a base station. And, based on this, 'optimized DM-RS pattern' can be applied and related information can be configured/indicated to a UE. In this case, the proposed method can be applied mainly to a base station's AI/ML/DL algorithm.

FIG. 10 illustrates a signaling procedure between a base station and a UE for a method of transmitting and receiving a DM-RS according to an embodiment of the present disclosure.

FIG. 10 illustrates a signaling procedure between a user equipment (UE) and a base station (BS) based on the method proposed above (e.g., any one of Embodiments #A1, A2, A3, A4 and their detailed embodiments, or a combination of one or more (detailed) embodiments). The example of FIG. 10 is for convenience of description and does not limit the scope of the present disclosure. Some step(s) illustrated in FIG. 10 may be omitted depending on circumstances and/or settings. In addition, the base station and the UE in FIG. 10 are only examples, and may be implemented as the device illustrated in FIG. 13 below. For example, the processor 102/202 of FIG. 13 may control transmission and reception of channels/signals/data/information, etc. using the transceiver 106/206, and may control to store transmitted or received channels/signals/data/information, etc. in the memory 104/204.

In addition, in the operation between the base station and the terminal of FIG. 10, the above-described contents may be referenced/used even if there is no separate mention.

A base station may be a general term for objects that transmit and receive data to and from a terminal. For example, the base station may be a concept including one or more transmission points (TPs), one or more transmission and reception points (TRPs), etc. Also, a TP and/or a TRP may include a panel of a base station, a transmission and reception unit, etc. In addition, "TRP" may be applied by being replaced with an expression such as a panel, an antenna array, a cell (e.g., macro cell/small cell/pico cell, etc.), a transmission point (TP), a base station (base station, gNB, etc.), etc. As described above, TRPs may be classified according to information (e.g., index, ID) on a CORESET group (or CORESET pool). For example, when one UE is configured to transmit/receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

Referring to FIG. 10, for convenience of description, signaling between one base station and a UE is considered, however the corresponding signaling scheme may be extended and applied to signaling between multiple TRPs and multiple UEs. In the following description, a base station may be interpreted as one TRP. Alternatively, a base station may include a plurality of TRPs, or may be one cell including a plurality of TRPs.

Referring to FIG. 10, a UE receives configuration information related to a DM-RS from a base station (S1001). That is, a base station transmits configuration information related to a DM-RS to a UE.

Here, the configuration information related to the DM-RS may include information for configuring an operation based on the previously proposed method (e.g., any one of Embodiments #A1, A2, A3, A4 and their detailed embodiments, or a combination of one or more (detailed) embodiments).

Additionally, the configuration information related to the DM-RS may correspond to one or both of downlink DM-RS configuration information (e.g. DMRS-DownlinkConfig IE) and uplink DM-RS configuration information (e.g. DMRS-UplinkConfig IE).

For example, the configuration information related to the DM-RS may include a configuration type of a DM-RS (e.g., configuration type 1 or 2), a location of an additional DM-RS, a maximum length, a scrambling ID, etc.

For example, according to Embodiment #A1 above, the configuration information related to the DM-RS may include information for defining/configuring a sub-CDM group (e.g., the number of REs in a sub-CDM group (RE group), the number of sub-CDM groups within a CDM group, when a sub-CDM group is repeated as a specific PRB unit, the number of specific PRBs, configuration information for multiple grouping methods with different numbers of sub-CDMs, a sub-CDM grouping index, etc.).

Additionally, for example, according to Embodiment #A2 above, the configuration information related to the DM-RS may include information for setting a DM-RS pattern. For example, the configuration information related to the DM-RS may include i) information for configuring a first DM-RS pattern (e.g. legacy DM-RS) and ii) information for configuring a second DMRS pattern with less density in a frequency domain (and/or time domain) than the first DM-RS pattern. Additionally, the configuration information related to the DM-RS may include information (e.g. DM-RS port(s) associated with MU transmission, DM-RS port(s) associated with SU transmission, the number of contiguous RBs scheduled/assigned, a DM-RS pattern applied for each frequency region, a size of scheduled/allocated RBs, etc.) necessary to determine which pattern to apply, a first DM-RS pattern or a second DM-RS pattern. In addition, the first DM-RS pattern may correspond to a pattern mapped/transmitted in an existing CDM group, and the second DM-RS pattern may correspond to a pattern mapped/transmitted in a sub-CDM group within an existing single CDM group.

In addition, for example, according to Embodiment #A3 above, the configuration information related to the DM-RS may include information on the number of front-loaded DM-RS symbols, the number of additional DM-RS symbols, etc.

In addition, for example, according to Embodiment #A4 above, the configuration information related to the DM-RS may include information for defining/configuring a sub-port group, information on an interference port, etc.

A UE receives downlink control information (DCI) for scheduling a PDSCH or a PUSCH from a base station (S1002). That is, a base station transmits downlink control information (DCI) for scheduling a PDSCH or a PUSCH to a UE.

Here, DCI may be transmitted through a PDCCH.

In addition, DCI may include time/frequency resource information allocated/scheduled for transmission of a PDSCH or a PUSCH, and one or more antenna port information. One or more antenna ports for PDSCH or PUSCH transmission can be equally applied for DM-RS transmission.

For example, according to Embodiment #A1 above, when multiple grouping methods with different numbers of sub-CDMs are configured, DCI may include a sub-CDM grouping index for the DM-RS for transmission and reception of a PDSCH or a PUSCH scheduled by the DCI.

A UE receives a PDSCH and a DM-RS for the PDSCH from a base station based on DCI, or transmits a PUSCH and a DM-RS for the PUSCH to a base station based on DCI (S1003). That is, a base station transmits a PDSCH and a DM-RS for the PDSCH to a UE based on DCI, or receives a PUSCH and a DM-RS for the PUSCH from a UE based on DCI.

Here, a DM-RS may be transmitted and received in a determined pattern based on information previously configured in the configuration information related to the DM-RS (or information additionally indicated by DCI) within the PDCSH/PUSCH transmission and reception area.

For example, based on whether one or more antenna ports indicated by the DCI are associated with single-user (SU) transmission or multi-user (MU) transmission, the DM-RS pattern may be determined among the first DM-RS pattern and the second DM-RS pattern. For example, when the one or more antenna ports indicated by the DCI are related to SU transmission, the pattern of the DM-RS may be determined as the first DM-RS pattern. As another example, when the one or more antenna ports indicated by the DCI are related to MU transmission, the pattern of the DM-RS may be determined as the second DM-RS pattern. Here, specific antenna port(s) may be predefined as being related to SU transmission (e.g., specified in a standard), and other than the predefined antenna port(s) may be considered as being related to MU transmission.

As described above, the first DM-RS pattern (e.g. legacy DM-RS) and the second DM-RS pattern correspond to patterns having different densities in a frequency domain (and/or time domain). In the present disclosure, for convenience of explanation, it is assumed that the second DM-RS pattern has less density in a frequency domain (and/or time domain) than the first DM-RS pattern.

In addition, for example, the second DM-RS pattern may be configured based on a specific sub-CDM group among a plurality of sub-CDM groups defined within a single CDM (code division multiplexing) group for the first DM-RS pattern. In other words, according to the first DM-RS pattern, a DM-RS can be mapped to REs belonging to a single CDM group, and according to the second DM-RS pattern, a DM-RS can be mapped to REs belonging to a specific sub-CDM group among sub-CDM groups defined/configured within the single CDM group.

Here, for example, the plurality of sub-CDM groups may be defined as a unit to which a frequency domain-orthogonal cover code (FD-OCC) is applied within the single CDM group. That is, one unit to which a FD-OCC is applied may correspond to one sub-CDM group.

In addition, for example, within the single CDM group, a plurality of grouping methods with different numbers of sub-CDM groups are defined, and the second DM-RS pattern may be configured/indicated by one of the plurality of grouping methods (e.g., by a sub-CDM grouping index).

Additionally, for example, the plurality of sub-CDM groups may be repeated in a specific physical resource block (PRB) unit (e.g., two PRBs) in a frequency domain.

In addition, for example, if the one or more antenna ports indicated by the DCI are associated with SU transmission and the pattern of the DM-RS is determined to be the second DM-RS pattern, the PDSCH or the PUSCH may be transmitted to one or more sub-CDM groups other than the sub-CDM group to which the DM-RS is transmitted.

In addition, for example, if the one or more antenna ports indicated by the DCI are associated with MU transmission and the pattern of the DM-RS is determined to be the second DM-RS pattern, the PDSCH or the PUSCH may not be transmitted to one or more sub-CDM groups other than the sub-CDM group to which the DM-RS is transmitted.

Meanwhile, although not shown, a UE may report i) information on a duration and/or ii) information on starting and ending points to which the first DM-RS pattern or the second DM-RS pattern can be applied, to a base station. In addition, a UE may report, to a base station, the number of specific additional DM-RSs and/or the density (e.g. number of sub-CDM groups) of supportable (or preferred) DM-RSs in a time/frequency domain, etc. A base station can configure an optimal DM-RS pattern for a UE based on the information reported from the UE.

FIG. 11 illustrates an operation of a UE for a method of transmitting and receiving a DM-RS according to an embodiment of the present disclosure.

FIG. 11 illustrates an operation of a UE based on the method proposed above (e.g., any one of Embodiments #A1, A2, A3, A4 and their detailed embodiments, or a combination of one or more (detailed) embodiments). The example of FIG. 11 is for convenience of description and does not limit the scope of the present disclosure. Some step(s) illustrated in FIG. 11 may be omitted depending on circumstances and/or settings. In addition, the UE in FIG. 11 is only examples, and may be implemented as the device illustrated in FIG. 13 below. For example, the processor 102/202 of FIG. 13 may control transmission and reception of channels/signals/data/information, etc. (e.g. RRC signaling, MAC CE, DCI for UL/DL scheduling, SS/PBCH block, CSI-RS, SRS, DM-RS, PDCCH, PDSCH, PUSCH, PUCCH, etc.) using the transceiver 106/206, and may control to store transmitted or received channels/signals/data/information, etc. in the memory 104/204.

Referring to FIG. 11, a UE receives configuration information related to a DM-RS from a base station (S1101).

Here, the configuration information related to the DM-RS may include information for configuring an operation based on the previously proposed method (e.g., any one of Embodiments #A1, A2, A3, A4 and their detailed embodiments, or a combination of one or more (detailed) embodiments).

Additionally, the configuration information related to the DM-RS may correspond to one or both of downlink DM-RS configuration information (e.g. DMRS-DownlinkConfig IE) and uplink DM-RS configuration information (e.g. DMRS-UplinkConfig IE).

For example, the configuration information related to the DM-RS may include a configuration type of a DM-RS (e.g., configuration type 1 or 2), a location of an additional DM-RS, a maximum length, a scrambling ID, etc.

For example, according to Embodiment #A1 above, the configuration information related to the DM-RS may include information for defining/configuring a sub-CDM group (e.g., the number of REs in a sub-CDM group (RE group), the number of sub-CDM groups within a CDM group, when a sub-CDM group is repeated as a specific PRB unit, the number of specific PRBs, configuration information for multiple grouping methods with different numbers of sub-CDMs, a sub-CDM grouping index, etc.).

Additionally, for example, according to Embodiment #A2 above, the configuration information related to the DM-RS may include information for setting a DM-RS pattern. For example, the configuration information related to the DM-RS may include i) information for configuring a first DM-RS pattern (e.g. legacy DM-RS) and ii) information for configuring a second DMRS pattern with less density in a frequency domain (and/or time domain) than the first DM-RS pattern. Additionally, the configuration information related to the DM-RS may include information (e.g. DM-RS port(s) associated with MU transmission, DM-RS port(s) associated with SU transmission, the number of contiguous RBs scheduled/assigned, a DM-RS pattern applied for each frequency region, a size of scheduled/allocated RBs, etc.) necessary to determine which pattern to apply, a first DM-RS pattern or a second DM-RS pattern. In addition, the first DM-RS pattern may correspond to a pattern mapped/transmitted in an existing CDM group, and the second DM-RS pattern may correspond to a pattern mapped/transmitted in a sub-CDM group within an existing single CDM group.

In addition, for example, according to Embodiment #A3 above, the configuration information related to the DM-RS may include information on the number of front-loaded DM-RS symbols, the number of additional DM-RS symbols, etc.

In addition, for example, according to Embodiment #A4 above, the configuration information related to the DM-RS may include information for defining/configuring a sub-port group, information on an interference port, etc.

A UE receives downlink control information (DCI) for scheduling a PDSCH or a PUSCH from a base station (S1102).

Here, DCI may be transmitted through a PDCCH.

In addition, DCI may include time/frequency resource information allocated/scheduled for transmission of a PDSCH or a PUSCH, and one or more antenna port information. One or more antenna ports for PDSCH or PUSCH transmission can be equally applied for DM-RS transmission.

For example, according to Embodiment #A1 above, when multiple grouping methods with different numbers of sub-CDMs are configured, DCI may include a sub-CDM grouping index for the DM-RS for transmission and reception of a PDSCH or a PUSCH scheduled by the DCI.

A UE receives a PDSCH and a DM-RS for the PDSCH from a base station based on DCI, or transmits a PUSCH and a DM-RS for the PUSCH to a base station based on DCI (S1103).

Here, a DM-RS may be transmitted and received in a determined pattern based on information previously configured in the configuration information related to the DM-RS (or information additionally indicated by DCI) within the PDCSH/PUSCH transmission and reception area.

For example, based on whether one or more antenna ports indicated by the DCI are associated with single-user (SU) transmission or multi-user (MU) transmission, the DM-RS pattern may be determined among the first DM-RS pattern and the second DM-RS pattern. For example, when the one or more antenna ports indicated by the DCI are related to SU transmission, the pattern of the DM-RS may be determined as the first DM-RS pattern. As another example, when the one or more antenna ports indicated by the DCI are related to MU transmission, the pattern of the DM-RS may be determined as the second DM-RS pattern. Here, specific antenna port(s) may be predefined as being related to SU transmission (e.g., specified in a standard), and other than the predefined antenna port(s) may be considered as being related to MU transmission.

As described above, the first DM-RS pattern (e.g. legacy DM-RS) and the second DM-RS pattern correspond to patterns having different densities in a frequency domain (and/or time domain). In the present disclosure, for convenience of explanation, it is assumed that the second DM-RS pattern has less density in a frequency domain (and/or time domain) than the first DM-RS pattern.

In addition, for example, the second DM-RS pattern may be configured based on a specific sub-CDM group among a plurality of sub-CDM groups defined within a single CDM (code division multiplexing) group for the first DM-RS pattern. In other words, according to the first DM-RS pattern, a DM-RS can be mapped to REs belonging to a single CDM group, and according to the second DM-RS pattern, a DM-RS can be mapped to REs belonging to a specific sub-CDM group among sub-CDM groups defined/configured within the single CDM group.

Here, for example, the plurality of sub-CDM groups may be defined as a unit to which a frequency domain-orthogonal cover code (FD-OCC) is applied within the single CDM group. That is, one unit to which a FD-OCC is applied may correspond to one sub-CDM group.

In addition, for example, within the single CDM group, a plurality of grouping methods with different numbers of sub-CDM groups are defined, and the second DM-RS pattern may be configured/indicated by one of the plurality of grouping methods (e.g., by a sub-CDM grouping index).

Additionally, for example, the plurality of sub-CDM groups may be repeated in a specific physical resource block (PRB) unit (e.g., two PRBs) in a frequency domain.

In addition, for example, if the one or more antenna ports indicated by the DCI are associated with SU transmission and the pattern of the DM-RS is determined to be the second DM-RS pattern, the PDSCH or the PUSCH may be transmitted to one or more sub-CDM groups other than the sub-CDM group to which the DM-RS is transmitted.

In addition, for example, if the one or more antenna ports indicated by the DCI are associated with MU transmission and the pattern of the DM-RS is determined to be the second DM-RS pattern, the PDSCH or the PUSCH may not be transmitted to one or more sub-CDM groups other than the sub-CDM group to which the DM-RS is transmitted.

Meanwhile, although not shown, a UE may report i) information on a duration and/or ii) information on starting and ending points to which the first DM-RS pattern or the second DM-RS pattern can be applied, to a base station. In addition, a UE may report, to a base station, the number of specific additional DM-RSs and/or the density (e.g. number of sub-CDM groups) of supportable (or preferred) DM-RSs in a time/frequency domain, etc.

FIG. 12 illustrates an operation of a base station for a method of transmitting and receiving a DM-RS according to an embodiment of the present disclosure.

FIG. 12 illustrates an operation of a UE based on the method proposed above (e.g., any one of Embodiments #A1, A2, A3, A4 and their detailed embodiments, or a combination of one or more (detailed) embodiments). The example of FIG. 12 is for convenience of description and does not limit the scope of the present disclosure. Some step(s) illustrated in FIG. 12 may be omitted depending on circumstances and/or settings. In addition, the base station in FIG. 12 is only examples, and may be implemented as the device illustrated in FIG. 13 below. For example, the processor 102/202 of FIG. 13 may control transmission and reception of channels/signals/data/information, etc. (e.g. RRC signaling, MAC CE, DCI for UL/DL scheduling, SS/PBCH block, CSI-RS, SRS, DM-RS, PDCCH, PDSCH, PUSCH, PUCCH, etc.) using the transceiver 106/206, and may control to store transmitted or received channels/signals/data/information, etc. in the memory 104/204.

Referring to FIG. 12, a base station transmits configuration information related to a DM-RS to a UE (S1201).

Here, the configuration information related to the DM-RS may include information for configuring an operation based on the previously proposed method (e.g., any one of Embodiments #A1, A2, A3, A4 and their detailed embodiments, or a combination of one or more (detailed) embodiments).

Additionally, the configuration information related to the DM-RS may correspond to one or both of downlink DM-RS configuration information (e.g. DMRS-DownlinkConfig IE) and uplink DM-RS configuration information (e.g. DMRS-UplinkConfig IE).

For example, the configuration information related to the DM-RS may include a configuration type of a DM-RS (e.g., configuration type 1 or 2), a location of an additional DM-RS, a maximum length, a scrambling ID, etc.

For example, according to Embodiment #A1 above, the configuration information related to the DM-RS may include information for defining/configuring a sub-CDM group (e.g., the number of REs in a sub-CDM group (RE group), the number of sub-CDM groups within a CDM group, when a sub-CDM group is repeated as a specific PRB unit, the number of specific PRBs, configuration information for multiple grouping methods with different numbers of sub-CDMs, a sub-CDM grouping index, etc.).

Additionally, for example, according to Embodiment #A2 above, the configuration information related to the DM-RS may include information for setting a DM-RS pattern. For example, the configuration information related to the DM-RS may include i) information for configuring a first DM-RS pattern (e.g. legacy DM-RS) and ii) information for configuring a second DMRS pattern with less density in a frequency domain (and/or time domain) than the first DM-RS pattern. Additionally, the configuration information related to the DM-RS may include information (e.g. DM-RS port(s) associated with MU transmission, DM-RS port(s) associated with SU transmission, the number of contiguous RBs scheduled/assigned, a DM-RS pattern applied for each frequency region, a size of scheduled/allocated RBs, etc.) necessary to determine which pattern to apply, a first DM-RS pattern or a second DM-RS pattern. In addition, the first DM-RS pattern may correspond to a pattern mapped/transmitted in an existing CDM group, and the second DM-RS pattern may correspond to a pattern mapped/transmitted in a sub-CDM group within an existing single CDM group.

In addition, for example, according to Embodiment #A3 above, the configuration information related to the DM-RS may include information on the number of front-loaded DM-RS symbols, the number of additional DM-RS symbols, etc.

In addition, for example, according to Embodiment #A4 above, the configuration information related to the DM-RS may include information for defining/configuring a sub-port group, information on an interference port, etc.

A base station transmits downlink control information (DCI) for scheduling a PDSCH or a PUSCH to a UE (S1202).

Here, DCI may be transmitted through a PDCCH.

In addition, DCI may include time/frequency resource information allocated/scheduled for transmission of a PDSCH or a PUSCH, and one or more antenna port information. One or more antenna ports for PDSCH or PUSCH transmission can be equally applied for DM-RS transmission.

For example, according to Embodiment #A1 above, when multiple grouping methods with different numbers of sub-CDMs are configured, DCI may include a sub-CDM grouping index for the DM-RS for transmission and reception of a PDSCH or a PUSCH scheduled by the DCI.

A base station transmits a PDSCH and a DM-RS for the PDSCH to a UE based on DCI, or receives a PUSCH and a DM-RS for the PUSCH from a UE based on DCI (S1203).

Here, a DM-RS may be transmitted and received in a determined pattern based on the configuration information related to the DM-RS (or information additionally indicated by DCI) within the PDCSH/PUSCH transmission and reception area.

For example, based on whether one or more antenna ports indicated by the DCI are associated with single-user (SU) transmission or multi-user (MU) transmission, the DM-RS pattern may be determined among the first DM-RS pattern and the second DM-RS pattern. For example, when the one or more antenna ports indicated by the DCI are related to SU transmission, the pattern of the DM-RS may be determined as the first DM-RS pattern. As another example, when the one or more antenna ports indicated by the DCI are related to MU transmission, the pattern of the DM-RS may be determined as the second DM-RS pattern. Here, specific antenna port(s) may be predefined as being related to SU transmission (e.g., specified in a standard), and other than the predefined antenna port(s) may be considered as being related to MU transmission.

As described above, the first DM-RS pattern (e.g. legacy DM-RS) and the second DM-RS pattern correspond to patterns having different densities in a frequency domain (and/or time domain). In the present disclosure, for convenience of explanation, it is assumed that the second DM-RS pattern has less density in a frequency domain (and/or time domain) than the first DM-RS pattern.

In addition, for example, the second DM-RS pattern may be configured based on a specific sub-CDM group among a plurality of sub-CDM groups defined within a single CDM (code division multiplexing) group for the first DM-RS pattern. In other words, according to the first DM-RS pattern, a DM-RS can be mapped to REs belonging to a single CDM group, and according to the second DM-RS pattern, a DM-RS can be mapped to REs belonging to a specific sub-CDM group among sub-CDM groups defined/configured within the single CDM group.

Here, for example, the plurality of sub-CDM groups may be defined as a unit to which a frequency domain-orthogonal cover code (FD-OCC) is applied within the single CDM group. That is, one unit to which a FD-OCC is applied may correspond to one sub-CDM group.

In addition, for example, within the single CDM group, a plurality of grouping methods with different numbers of sub-CDM groups are defined, and the second DM-RS pattern may be configured/indicated by one of the plurality of grouping methods (e.g., by a sub-CDM grouping index).

Additionally, for example, the plurality of sub-CDM groups may be repeated in a specific physical resource block (PRB) unit (e.g., two PRBs) in a frequency domain.

In addition, for example, if the one or more antenna ports indicated by the DCI are associated with SU transmission and the pattern of the DM-RS is determined to be the second DM-RS pattern, the PDSCH or the PUSCH may be transmitted to one or more sub-CDM groups other than the sub-CDM group to which the DM-RS is transmitted.

In addition, for example, if the one or more antenna ports indicated by the DCI are associated with MU transmission and the pattern of the DM-RS is determined to be the second DM-RS pattern, the PDSCH or the PUSCH may not be transmitted to one or more sub-CDM groups other than the sub-CDM group to which the DM-RS is transmitted.

Meanwhile, although not shown, a base station may receive i) information on a duration and/or ii) information on starting and ending points to which the first DM-RS pattern or the second DM-RS pattern can be applied, from a UE. In addition, a base station may receive, from a UE, the number of specific additional DM-RSs and/or the density (e.g. number of sub-CDM groups) of supportable (or preferred) DM-RSs in a time/frequency domain, etc. A base station can configure an optimal DM-RS pattern for a UE based on the information reported from the UE.

General Device to Which the Present Disclosure May be Applied

FIG. 13 is a diagram which illustrates a block diagram of a wireless communication device according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method of receiving a demodulation reference signal (DM-RS) in a wireless communication system, the method performed by a user equipment (UE) comprising:

receiving, from a base station, configuration information related to a DM-RS;

receiving, from the base station, downlink control information (DCI) for scheduling a physical downlink shared channel (PDSCH); and receiving the PDSCH and a DM-RS for the PDSCH based on the DCI, wherein i) a first DM-RS pattern and ii) a second DM-RS pattern having less density than the first DM-RS pattern in a frequency domain are configured by the configuration information, wherein based on whether one or more antenna ports indicated by the DCI are associated with single-user (SU) transmission or multi-user (MU) transmission, a pattern of the DM-RS is determined among the first DM-RS pattern and the second DM-RS pattern, and wherein the second DM-RS pattern is configured based on a specific sub-code division multiplexing (CDM) group among a plurality of sub-CDM groups defined in a single CDM group for the first DM-RS pattern.

2. The method of claim 1, wherein based on the one or more antenna ports indicated by the DCI being associated with SU transmission, the pattern of the DM-RS is determined by the first DM-RS pattern.

3. The method of claim 1, wherein based on the one or more antenna ports indicated by the DCI being associated with MU transmission, the pattern of the DM-RS is determined by the second DM-RS pattern.

4. The method of claim 1, wherein one or more specific antenna ports are predefined as being associated with the SU transmission, and wherein remaining antenna ports other than the specific one or more antenna ports are associated with the MU transmission.

5. The method of claim 1, wherein based on the one or more antenna ports indicated by the DCI being associated with SU transmission and the pattern of the DM-RS being determined as the second DM-RS pattern, the PDSCH is transmitted in one or more sub-CDM groups other than a sub-CDM group in which the DM-RS is transmitted.

6. The method of claim 1, wherein based on the one or more antenna ports indicated by the DCI being associated with MU transmission and the pattern of the DM-RS being determined as the second DM-RS pattern, the PDSCH is not transmitted in one or more sub-CDM groups other than a sub-CDM group in which the DM-RS is transmitted.

7. The method of claim 1, wherein the plurality of sub-CDM groups are defined by a unit to which a frequency domain-orthogonal cover code (FD-OCC) is applied within the single CDM group.

8. The method of claim 1, wherein a plurality of grouping methods with different numbers of sub-CDM groups are defined in the single CDM group, and wherein the second DM-RS pattern is configured as one of the plurality of grouping methods.

9. The method of claim 1, wherein the plurality of sub-CDM groups are repeated in units of specific physical resource blocks (PRB) in a frequency domain.

10. The method of claim 1, further comprising: reporting, to the base station, i) information on a duration and/or ii) information on a start and an end to which the first DM-RS pattern or the second DM-RS pattern can be applied.

11. A user equipment (UE) of receiving a demodulation reference signal (DM-RS) in a wireless communication system, the UE comprising:

at least one transceiver for transmitting and receiving a wireless signal; and at least one processor for controlling the at least one transceiver,

wherein the at least one processor configured to:

receive, from a base station, configuration information related to a DM-RS;

receive, from the base station, downlink control information (DCI) for scheduling a physical downlink shared channel (PDSCH); and receive the PDSCH and a DM-RS for the PDSCH based on the DCI, wherein i) a first DM-RS pattern and ii) a second DM-RS pattern having less density than the first DM-RS pattern in a frequency domain are configured by the configuration information, wherein based on whether one or more antenna ports indicated by the DCI are associated with single-user (SU) transmission or multi-user (MU) transmission, a pattern of the DM-RS is determined among the first DM-RS pattern and the second DM-RS pattern, and wherein the second DM-RS pattern is configured based on a specific sub-code division multiplexing (CDM) group among a plurality of sub-CDM groups defined in a single CDM group for the first DM-RS pattern.

12. A base station of transmitting a demodulation reference signal (DM-RS) in a wireless communication system, the base station comprising:

at least one transceiver for transmitting and receiving a wireless signal; and at least one processor for controlling the at least one transceiver, wherein the at least one processor configured to:

transmit, to a user equipment (UE), configuration information related to a DM-RS;

transmit, to the UE, downlink control information (DCI) for scheduling a physical downlink shared channel (PDSCH); and transmit the PDSCH and a DM-RS for the PDSCH based on the DCI, wherein i) a first DM-RS pattern and ii) a second DM-RS pattern having less density than the first DM-RS pattern in a frequency domain are configured by the configuration information, and wherein based on whether one or more antenna ports indicated by the DCI are associated with single-user (SU) transmission or multi-user (MU) transmission, a pattern of the DM-RS is determined among the first DM-RS pattern and the second DM-RS pattern, and wherein the second DM-RS pattern is configured based on a specific sub-code division multiplexing (CDM) group among a plurality of sub-CDM groups defined in a single CDM group for the first DM-RS pattern.

* * * * *